US011553318B2

United States Patent
Hu et al.

(10) Patent No.: US 11,553,318 B2
(45) Date of Patent: Jan. 10, 2023

(54) ROUTING METHOD FOR MOBILE SENSOR PLATFORMS

(71) Applicant: Aclima Inc., San Francisco, CA (US)

(72) Inventors: Jie Hu, San Francisco, CA (US); Jessica Jenkins, San Francisco, CA (US); Nicole Goebel, Santa Cruz, CA (US)

(73) Assignee: Aclima Inc., San Francisco, CA (US)

( * ) Notice: Subject to any disclaimer, the term of this patent is extended or adjusted under 35 U.S.C. 154(b) by 0 days.

(21) Appl. No.: 17/332,789

(22) Filed: May 27, 2021

(65) Prior Publication Data

US 2021/0377708 A1     Dec. 2, 2021

Related U.S. Application Data

(60) Provisional application No. 63/031,465, filed on May 28, 2020.

(51) Int. Cl.
*G08B 1/08*     (2006.01)
*H04W 4/40*    (2018.01)
(Continued)

(52) U.S. Cl.
CPC ............ *H04W 4/40* (2018.02); *G06K 9/6256* (2013.01); *G06K 9/6265* (2013.01); *G08C 17/02* (2013.01); *H04W 4/38* (2018.02)

(58) Field of Classification Search
CPC ........ H04W 4/40; H04W 4/38; G06K 9/6256; G06K 9/6265; G08C 17/02
(Continued)

(56) References Cited

U.S. PATENT DOCUMENTS 5,591,974 A     1/1997   Troyer
8,718,932 B1 *  5/2014   Pack .................... G01C 21/30
                                                701/446
(Continued)

FOREIGN PATENT DOCUMENTS

WO      2019025906      2/2019

OTHER PUBLICATIONS

Development Asia, Improving Environmental Data Collection and Reporting in Mongolia, Mar. 31, 2020.
(Continued)

*Primary Examiner* — Kerri L McNally
*Assistant Examiner* — Thang D Tran
(74) *Attorney, Agent, or Firm* — Van Pelt, Yi & James LLP

(57) ABSTRACT

A method for routing, through a geographic region over a time interval, a sensor platform mounted on a vehicle is described. The method includes receiving a precision level for at least one constituent of an environment measured by a sensor of the sensor platform. The precision level corresponds to a mean concentration of the constituent(s) over the time interval. A reference dataset corresponding to the geographic region and the time interval is selected. From the reference dataset and the precision level, at least one minimum number of distinct samples for a plurality of geographic segments of the geographic region is determined. The method also includes determining a number of passes for the geographic region over the time interval using the minimum number of distinct samples for each of the plurality of geographic segments. Each pass of the number of passes is part of a route for the vehicle.

18 Claims, 8 Drawing Sheets

(51) Int. Cl.
*H04W 4/38* (2018.01)
*G06K 9/62* (2022.01)
*G08C 17/02* (2006.01)

(58) Field of Classification Search
USPC .................................................... 340/539.1
See application file for complete search history.

(56) References Cited

U.S. PATENT DOCUMENTS

| | | | | |
|---|---|---|---|---|
| 10,820,166 | B1* | 10/2020 | Zhang | G07C 5/008 |
| 2004/0090628 | A1* | 5/2004 | Ershov | G01N 21/031 |
| | | | | 356/438 |
| 2006/0237657 | A1* | 10/2006 | Gamiles | G01N 21/33 |
| | | | | 250/372 |
| 2008/0024323 | A1* | 1/2008 | Kadaba | G08G 1/096775 |
| | | | | 340/905 |
| 2008/0027833 | A1* | 1/2008 | Myers | G06Q 10/087 |
| | | | | 705/28 |
| 2008/0046165 | A1* | 2/2008 | Downs | G08G 1/0104 |
| | | | | 701/117 |
| 2008/0270269 | A1* | 10/2008 | Myers | G06Q 10/087 |
| | | | | 705/28 |
| 2009/0084976 | A1* | 4/2009 | Camilli | H01J 49/24 |
| | | | | 250/397 |
| 2009/0248322 | A1* | 10/2009 | Hlavaty | G01N 21/3581 |
| | | | | 702/28 |
| 2011/0251800 | A1* | 10/2011 | Wilkins | G01J 3/0264 |
| | | | | 702/24 |
| 2011/0257922 | A1* | 10/2011 | Fang | G01N 1/2273 |
| | | | | 702/45 |
| 2012/0254242 | A1* | 10/2012 | Kanagasabapathi | |
| | | | | G06Q 30/0201 |
| | | | | 707/E17.014 |
| 2020/0074307 | A1* | 3/2020 | Kent | C02F 3/28 |
| 2020/0211231 | A1* | 7/2020 | Brownlee | G06T 9/40 |
| 2021/0168152 | A1* | 6/2021 | Herrema, III | G06F 16/29 |
| 2021/0188309 | A1* | 6/2021 | Zhu | B60W 40/072 |

OTHER PUBLICATIONS

Lee et al., Efficient Data Harvesting in Mobile Sensor Platforms, Fourth Annual IEEE International Conference on Pervasive Computing and Communications Workshops (PERCOMW'06), Mar. 17, 2006.

Mazaheri et al., Investigations into Factors Affecting Personal Exposure to Particles in Urban Microenvironments using Low-cost Sensors, Science Direct, Environment International, vol. 120, Nov. 2018, pp. 496-504.

* cited by examiner

1000

ROUTING METHOD FOR MOBILE SENSOR PLATFORMS

CROSS REFERENCE TO OTHER APPLICATIONS

This application claims priority to U.S. Provisional Patent Application No. 63/031,465 entitled SAMPLING METHOD FOR MOBILE MONITORING PLATFORMS filed May 28, 2020 which is incorporated herein by reference for all purposes.

BACKGROUND OF THE INVENTION

Monitoring of environmental conditions includes measuring the levels of various components of the surroundings, allowing detection of potentially harmful air pollution, radiation, greenhouse gases or other contaminants in the environment. Depending on the application, environmental monitoring systems can be used in outdoor or indoor settings. Monitoring of environmental conditions typically includes gathering environmental data. Environmental data includes detection and measurement of pollutants or contaminants such as nitrogen dioxide ($NO_2$), carbon monoxide (CO), nitrogen oxide (NO), ozone ($O_3$), sulphur dioxide ($SO_2$), carbon dioxide ($CO_2$), methane ($CH_4$), volatile organic compounds (VOC), air toxics, temperature, sound radiation and particulate matter. In order to assess the effects of such pollutants, it is desirable to associate environmental data sensing these pollutants at particular times with geographic locations (homes, businesses, towns, etc.). Such an association would allow individuals and communities to evaluate the quality of their surroundings. Thus, data collected that is representative of the region is desired to be collected. Further, the data collected is desired to meet desired error tolerances, and be collected and processed efficiently. Thus, a mechanism for improving collection and processing of environmental data is desired.

BRIEF DESCRIPTION OF THE DRAWINGS

Various embodiments of the invention are disclosed in the following detailed description and the accompanying drawings.

DETAILED DESCRIPTION

Figure 1:
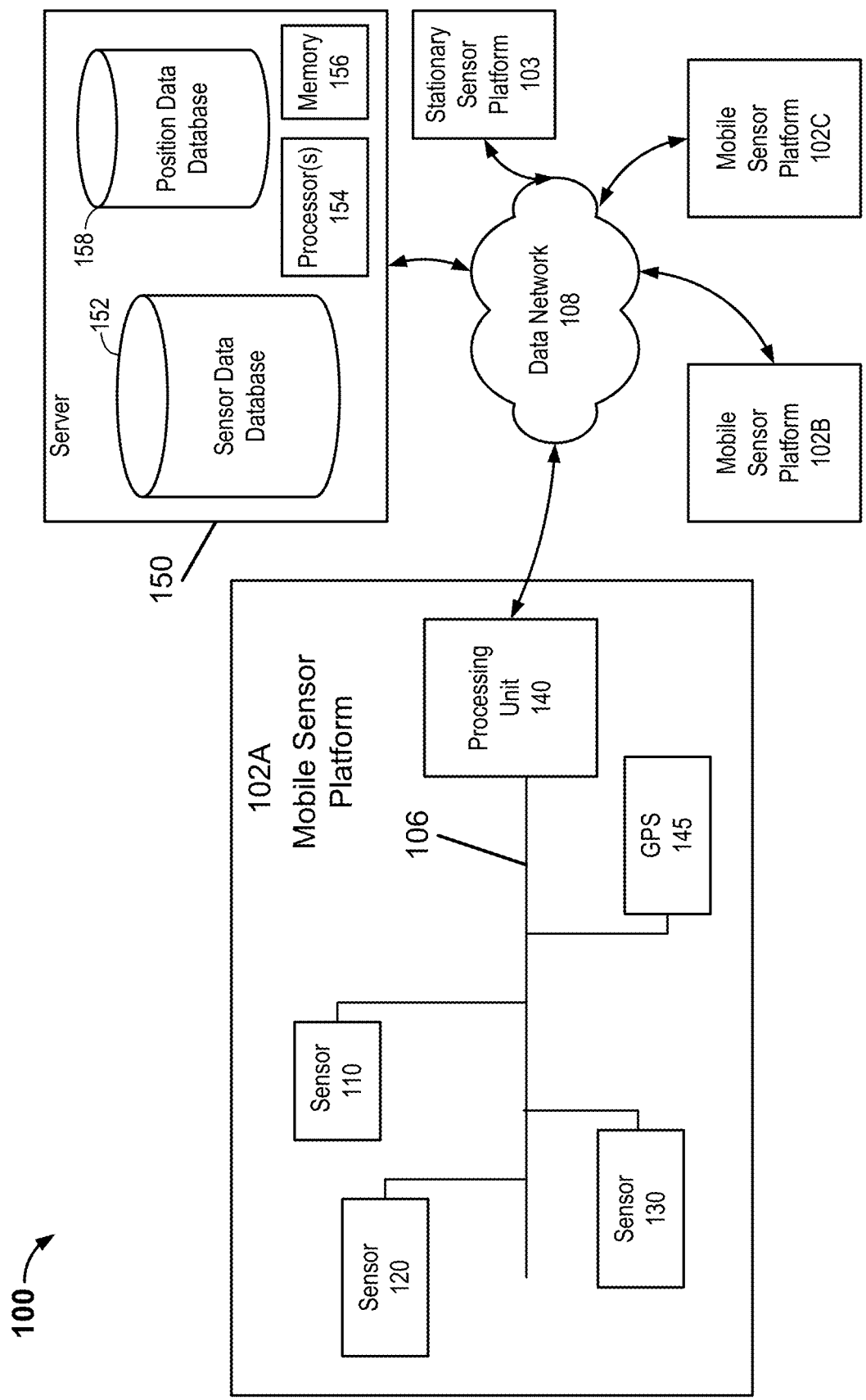
FIG. 1 depicts an embodiment of a system for capturing environmental data using mobile sensor platforms and associating the environmental data with map features.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Environmental data includes measurements of pollutants, contaminants and/or other components of the environment. Environmental quality can be assessed based on this environmental data and is a measure of the suitability of the surroundings for humans. An important aspect of environmental quality is air quality. However, other conditions in the environment may also be desired to be monitored. Environmental data thus includes but is not limited to measurements related to air quality (e.g. the presence or absence of various pollutants in the air) as well as other features of the surroundings. Environmental data may include measurements of pollutants, contaminants, and/or other conditions. For example, environmental data may be gathered on nitrogen dioxide ($NO_2$), carbon monoxide (CO), nitrogen oxide (NO), ozone ($O_3$), sulphur dioxide ($SO_2$), carbon dioxide ($CO_2$), methane ($CH_4$), volatile organic compounds (VOCs), air toxics, particulate matter (PM), radiation, noise, temperature, other pathogens and/or other conditions that may affect humans.

Environmental data may vary based upon a variety of factors, such as the location(s) and type pollutant source(s), intrinsic spatial variations in pollutants, environmental conditions such as the wind, variations in terrain and/or the presence of man-made structures such as buildings. Consequently, environmental data may have significant local geographic variations. In addition to variations with geographic location, environmental data can also change over time. Due to changing conditions, such as fluctuations in the atmospheric climate, a pollutant's concentration level at a particular location can change over time. Such variations can occur even if a nearby emission source releases a pollutant at a constant rate. Thus, spatial and temporal variations in environmental data may occur.

To facilitate environmental quality assessments, environmental data is desired to be associated with geographic regions, or portions thereof, as well as with particular time intervals. A geographic region corresponds to a geographic location and is identifiable on a map. For example, a geographic region may be a county, a city, and/or a neighborhood. A portion of the geographic region may be a road or section thereof (e.g. a road segment), a defined region that can be located on a map (e.g. a cell that may be identified by latitude and longitude boundaries), a location such as an address, a specific point such as a latitude and longitude and/or other geographic attribute that can be identified on a map and may be limited in length and/or area. Environmental quality assessments may also be for particular time intervals. A time interval of interest may be an hour, a day, a week, a month, a quarter, a year, and/or another time period.

Stationary monitoring platforms, such as from U.S. Environmental Protection Agency (EPA)'s central sites, sense the levels of various pollutants. Data from such stationary monitoring platforms may be used in assessing environmental quality. Typically, data is collected by multiple sensors at the site. Each sensor may collect data at one second, one minute, one hour, or other time intervals, twenty-four hours per day, and three hundred and sixty-five days per year. Although such data is useful, it represents a single location. The data may not adequately describe a larger geographic region. For example, if there are significant variations in local sources, terrain and/or atmospheric conditions, the data from the EPA's central site may not be generalized to a nearby location. A large number of stationary monitoring platforms analogous to the EPA's central sites could be utilized to cover a geographic region and provide the desired geographic sensitivity. However, a large number of such stationary monitoring platforms may be expensive and may generate more data than is desired or necessary. Further, averages, medians, standards of deviations and other measures of various constituents of the environment are desired to be determined. Real time or close to real time processing of such large volumes of data may be challenging. A lower cost network of stationary sensor platforms might be utilized in lieu of the EPA central sites. However, the sensors of such lower cost networks may be difficult to maintain. Further, these types of sensors tend to provide data that is inconsistent or unreliable over time and/or may only include a subset of the sensors desired for adequately assessing environmental quality.

Mobile sensors might be used to collect environmental data. A mobile sensor may be used to capture environmental data at a variety of locations. However, a mobile sensor is limited to capturing data for a particular time at its current location. Data at the same location for a different time may not be captured by the sensor. As a result, a mobile sensor might not capture temporal variations at a particular geographic location. Similarly, data in other locations for the particular time may not be captured by the sensor. Even if multiple mobile sensors are utilized, there may be temporal and/or geographic gaps in the data. For example, mobile sensors mounted on two different vehicles may move through a city capturing data substantially continuously for a year. However, there may still be significant amounts of time at any given location for which there is no data and/or locations that have little or no data captured for the entire year. Employing an extremely large number of mobile sensors capturing data twenty-four hours per day and seven days per week may fill in gaps in the data captured, but suffers from the same drawbacks as using a large number of stationary sensor platforms. Use of such a large number of mobile sensors may be expensive and may result in extremely large amounts of data (e.g. for mobile sensors capturing data every second) that is challenging to process in the desired amount of time. Consequently, a mechanism for capturing environmental data using mobile platforms that is efficient, that may capture temporal and localized geographic variations, and that may be used in assessing the environmental quality is desired.

A method for routing, through a geographic region over a time interval, a sensor platform mounted on a vehicle is described. The method includes receiving a precision level for at least one constituent of an environment measured by a sensor of the sensor platform. The precision level may correspond to a mean concentration of the constituent(s) over the time interval. In some embodiments, the precision level is based on a tolerance in a relative error rate and a false positive error rate. A reference dataset corresponding to the geographic region and the time interval is selected. From the reference dataset and the precision level, at least one minimum number of distinct samples for a plurality of geographic segments of the geographic region is determined. The method also includes determining a number of passes for the geographic region over the time interval using the minimum number of distinct samples for each of the plurality of geographic segments. Thus, the number of passes for the geographic region is some function of the number of passes determined for each geographic segment in the geographic region. Each pass of the number of passes is part of a route for the vehicle. In some embodiments, the geographic segments include a plurality of road segments, each of the plurality of road segments having a length not exceeding one hundred meters. In some embodiments, the geographic segments include cells. Each of the cells has a characteristic length not exceeding two hundred meters. Other road segment lengths, including larger road segments or larger cells, may be used in some embodiments.

In some embodiments, the reference dataset includes at least one of stationary sensor site data, satellite data, and stationary sensor network data. In some embodiments, determining the minimum number(s) of distinct samples further includes dividing the reference dataset into strata. Each of the strata includes a subpopulation size and corresponds to a portion of the time interval. The method also includes determining an allocation proportion of a total sample size to each stratum and determining a per stratum number of distinct samples for each stratum. The per stratum number of distinct samples corresponds to the allocation proportion for each stratum. The method also includes selecting samples from each of the strata. In some embodiments, the determining the number of passes further includes determining, using the reference dataset, a time period for each pass of a portion of the plurality of geographic segments.

A system for routing, through a geographic region over a time interval, a sensor platform mounted on a vehicle is described. The system includes a processor and a memory coupled to the processor and configured to provide the processor with instructions. The processor is configured to receive a precision level for the mean concentration over the time interval constituent(s) of an environment measured by a sensor of the sensor platform. In some embodiments, the precision level is based on a tolerance in a relative error rate and a false positive error rate. The processor also selects a reference dataset corresponding to the geographic region and the time interval. The processor is also configured to determine, from the reference dataset and the precision level, at least one minimum number of distinct samples for a plurality of geographic segments of the geographic region. The processor also determines a number of passes for the geographic region over the time interval using the minimum number of distinct samples for each of the plurality of geographic segments. Stated differently, the number of passes is determined based on the minimum number of distinct samples. Each pass of the number of passes is part of a route for the vehicle.

To determine the minimum number(s) of distinct samples, the processor may be further configured to account for a sensor measurement error. In some embodiments, to determine the minimum number(s) of distinct samples, the processor is further configured to divide the reference dataset into strata. Each of the strata includes a subpopulation size and corresponds to a portion of the time interval. The processor determines the desired allocation of the samples to each of the strata as well as the per stratum number of distinct samples (e.g. the number of distinct samples corresponding to the allocation proportion for the stratum). The processor also selects samples from each of the strata. In some embodiments, the geographic segments include road segments. Each of the road segments having a length not exceeding one hundred meters in some embodiments. Other lengths are possible.

In some embodiments, the geographic segments include cells. Each of the cells has a characteristic length not exceeding two hundred meters, for example. In some embodiments, to determine the number of passes, the processor is further configured to determine, using the reference dataset, a time period for each pass of a portion of the geographic segments. The time period is within a twenty-four hour window (e.g. a day). In some embodiments, the reference dataset includes stationary sensor site data, satellite data, and/or stationary sensor network data.

A computer program product for routing, through a geographic region over a time interval, a sensor platform mounted on a vehicle, is described. The computer program product is embodied in a tangible computer readable storage medium. The computer program product includes computer instructions for receiving a precision level for at least one constituent of an environment measured by a sensor of the sensor platform. The precision level corresponds to a mean concentration of the constituent(s). The computer program product also includes computer instructions for selecting a reference dataset corresponding to the geographic region and the time interval. The computer program product also includes computer instructions for determining, from the reference dataset and the precision level, minimum number(s) of distinct samples for a plurality of geographic segments of the geographic region. The computer program product also includes instructions for determining a number of passes for the geographic region over the time interval using the minimum number of distinct samples for each of the plurality of geographic segments. Each pass of the number of passes is part of a route for the vehicle.

In some embodiments, the computer instructions for determining the minimum number(s) of distinct samples further includes computer instructions for dividing the reference dataset into a plurality of strata Each of the strata includes a subpopulation size and corresponds to a portion of the time interval. The computer program product also includes computer instructions for determining an allocation proportion of a total sample size for each stratum and a number of distinct samples for each stratum. The computer instructions also include computer instructions for selecting a plurality of samples from each of the plurality of strata.

Hyper-local environmental data, for example related to air quality and greenhouse gas data, can be collected using vehicles with air pollutants sensors installed. Embodiments of techniques usable in gathering hyper-local data are described in U.S. patent application Ser. No. 16/682,871, filed on Nov. 13, 2019, entitled HYPER-LOCAL MAPPING OF ENVIRONMENTAL CONDITIONS and assigned to the assignee of the present application, U.S. patent application Ser. No. 16/409,624, filed on May 10, 2019, entitled INTEGRATION AND ACTIVE FLOW CONTROL FOR ENVIRONMENTAL SENSORS and assigned to the assignee of the present application; U.S. patent application Ser. No. 16/773,873, filed on Jan. 27, 2020, entitled SENSOR DATA AND PLATFORMS FOR VEHICLE ENVIRONMENTAL QUALITY MANAGEMENT, assigned to the assignee of the present application and which claims priority to U.S. Patent Application Ser. No. 62/798,395 entitled SENSOR DATA AND PLATFORMS FOR VEHICLE ENVIRONMENTAL QUALITY MANAGEMENT and assigned to the assignee of the present application, which are all incorporated herein in their entirety for all purposes.

FIG. 1 depicts an embodiment of a system 100 for collecting and processing environmental data. System 100 includes multiple mobile sensor platforms 102A, 102B, 102C (collectively or generically 102) and server 150. In some embodiments, system 100 may also include one or more stationary sensor platforms 103, of which one is shown. Stationary sensor platform 103 may be used to collect environmental data at a fixed location. The environmental data collected by stationary sensor platform 103 may supplement the data collected by mobile sensor platforms 102. Thus, stationary sensor platform 103 may have sensors that are the same as or analogous to the sensors for mobile sensor platforms 102A. In other embodiments, stationary sensor platform 103 may be omitted. Although a single server 150 is shown, multiple servers may be used. The multiple servers may be in different locations. Although three mobile sensor platforms 102 are shown, another number are typically present. Mobile sensor platforms 102 and stationary sensor platform(s) 103 may communicate with server 150 via a data network 108. The communication may take place wirelessly.

Mobile sensor platforms 102 may be mounted in a vehicle, such as an automobile or a drone. In some embodiments, mobile sensor platforms 102 are desired to stay in proximity to the ground to be better able to sense conditions analogous to what a human would experience. Mobile sensor platform 102A includes a bus 106, sensors 110, 120 and 130. Although three sensors are shown, another number may be present on mobile sensor platform 102A. In addition, a different configuration of components may be used with sensors 110, 120 and 130. Each sensor 110, 120 and 130 is used to sense environmental quality and may be of primary interest to a user of system 100. For example, sensors 110, 120 and 130 may be gas sensors, volatile organic compound (VOC) sensors, particulate matter sensors, radiation sensors, noise sensors, light sensors, temperature sensors, noise sensors or other analogous sensors that capture variations in the environment. For example, sensors 110, 120 and 130 may be used to sense one or more of $NO_2$, $CO$, $NO$, $O_3$, $SO_2$, $CO_2$, VOCs, $CH4$, particulate matter, noise, light, temperature, radiation sand other compounds. In some embodiments, sensor 110, 120 and/or 130 may be a multi-modality sensor. A multi-modality gas sensor senses multiple gases or compounds. For example, if sensor 110 is a multi-modality $NO_2/O_3$ sensor, sensor 110 might sense both $NO_2$ and $O_3$ together.

Although not shown in FIG. 1, other sensors co-located with sensors 110, 120 and 130 may be used to sense characteristics of the surrounding environment including, in some instances, other gases and/or matter. Such additional sensors are exposed to the same environment as sensors 110, 120 and 130. In some embodiments, such additional sensors are in close proximity to sensors 110, 120 and 130, for example within ten millimeters or less. In some embodiments, the additional sensors may be further from sensors 110, 120 and 130 if the additional sensors sample the same packet of air inside of a closed system, such as a system of closed tubes. In some embodiments, temperature and/or pressure are sensed by these additional sensors. For example, an additional sensor co-located with sensor 110 may be a temperature, pressure and relative humidity (T/P/RH) sensor. These additional co-located sensors may be used to calibrate sensors 110, 120 and/or 130. Although not shown, sensor platform 102A may also include a manifold for drawing in air and transporting air to sensors 110, 120 and 130 for testing.

Sensors 110, 120 and 130 provide sensor data over bus 106, or via another mechanism. In some embodiments, data from sensors 110, 120 and 130 incorporates time. This time may be provided by a master clock (not shown) and may take the form of a timestamp. Master clock may reside on sensor platform 102A, may be part of processing unit 140, or may be provided from server 150. As a result, sensors 110, 120 and 130 may provide timestamped sensor data to server 150. In other embodiments, the time associated with the sensor data may be provided in another manner. Because sensors 110, 120 and 130 generally capture data at a particular frequency, sensor data is discussed as being associated with a particular time interval (e.g. the period associated with the frequency), though the sensor data may be time stamped with a particular value. For example, sensors 110, 120 and/or 130 may capture sensor data every second, every two seconds, every ten seconds, or every thirty seconds. The time interval may be one second, two seconds, ten seconds or thirty seconds. The time interval may be the same for all sensors 110, 120 and 130 or may differ for different sensors 110, 120 and 130. In some embodiments, the time interval for a sensor data point is centered on the timestamp. For example, if the time interval is one second and a timestamp is t1, then the time interval may be from t1−0.5 seconds to t1+0.5 seconds. However, other mechanisms for defining the time interval may be used.

Sensor platform 102A also includes a position unit 145 that provides position data. In some embodiments, position unit 145 is a global positioning satellite (GPS) unit. Consequently, system 100 is described in the context of a GPS unit 145. The position data may be time-stamped in a manner analogous to sensor data. Because position data is to be associated with sensor data, the position data may also be considered associated with time intervals, as described above. However, in some embodiments, position data (e.g. GPS data) may be captured more or less frequently than sensor data. For example, GPS unit 145 may capture position data every second, while sensor 130 may capture data every thirty seconds. Thus, multiple data points for the position data may be associated with a single thirty second time interval. The position data may be processed such that an accurate indication of the location of mobile sensor platform 102A during the time sensor 130 is measuring data may be obtained. For example, in some embodiments, the position of mobile sensor platform 102A may be determined to within a geographic segment, discussed below.

Optional processing unit 140 may perform some processing and functions for data from sensor platform 104, may simply pass data from sensor platform 104 to server 150 or may be omitted.

Mobile sensors platforms 102B and 102C are analogous to mobile sensor platform 102A. In some embodiments, mobile sensor platforms 102B and 102C have the same components as mobile sensor platform 102A. However, in other embodiments, the components may differ. However, mobile sensor platforms 102A, 102B and 102C function in an analogous manner.

Server 150 includes sensor data database 152, processor(s) 154, memory 156 and position data database 158. Processor(s) 154 may include multiple cores. Processor(s) 154 may include one or more central processing units (CPUs), one or more graphical processing units (GPUs) and/or one or more other processing units. Memory 156 can include a first primary storage, typically a random access memory (RAM), and a second primary storage area, typically a non-volatile storage such as solid state drive (SSD) or hard disk drive (HDD). Memory 156 stores programming instructions and data for processes operating on processor(s) 154. Primary storage typically includes basic operating instructions, program code, data and objects used by processor(s) 154 to perform their functions. Primary storage devices (e.g., memory 156) may include any suitable computer-readable storage media, described below, depending on whether, for example, data access needs to be bi-directional or uni-directional Sensor data database 152 includes data received from mobile sensor platforms 102A, 102B and/or 102C. After capture by mobile sensor platform 102A, 102B and/or 102C, sensor data stored in sensor data database 152 may be operated on by various analytics, as described below. Position data database 158 stores position data received from mobile sensor platforms 102A, 102B and/or 102C. In some embodiments, sensor data database 152 stores position data as well as sensor data. In such embodiments, position data database 158 may be omitted. Server 150 may include other databases and/or store and utilize other data. For example, server 150 may include calibration data (not shown) used in calibrating sensors 110, 120 and 130.

System 100 may be used to capture, analyze and provide information regarding hyper-local environmental data. Mobile sensor platforms 102A, 102B and 102C may be used to traverse routes and provide sensor and position data to server 150. Server 150 may process the sensor data and position data. Server 150 may also assign the sensor data to map features corresponding to the locations of mobile sensor platforms 102A, 102B and 102C within the same time interval as the sensor data was captured. As discussed above, these map features may be hyper-local (e.g. one hundred meter or less road segments or thirty meter or less road segments). Thus, mobile sensor platforms 102A, 102B and 102C may provide sensor data that can capture variations on this hyper-local distance scale. Server 150 may provide the environmental data, a score, confidence score and/or other assessment of the environmental data to a user. Thus, using system 100 hyper-local environmental data may be obtained using a relatively sparse network of mobile sensor platforms 102A, 102B and 102C, associated with hyper-local map features and processed for improved understanding of users.

To collect hyper-local environmental data, multiple vehicles including mobile sensor platforms 102 may be sent on various days to cover a geographic region over an interval of time. The geographic region may be divided into geographic segments, such as road segments and/or cells. For example, each road in a geographic region may be divided into road segments, each of which may have a specified length. For example, a road segment may be not more than two hundred meters long in some embodiments. In some embodiments, the road segment may be not more than one hundred meters. In some embodiments, the road segment may be not more than thirty meters. In some embodiments, the road segment may be not more than twenty meters. In some embodiments, a geographic segment may be a cell with a characteristic length (e.g. diameter, length on an edge, etc.) in the same ranges as described for a road segment. In some embodiments, a geographic segment may be defined in another manner. For example, a road segment may be defined to have a length that is sufficiently short that measurements of particular sensor(s) in mobile sensor platform 102 vary less than a particular amount.

Environmental data from each geographic segment is measured at multiple visits during this time interval Each visit to a geographic segment is considered a pass for that segment. In some embodiments, multiple measurements, or samples, may be taken by each sensor at each geographic segment. Although multiple samples are taken, because these measurements are made during a single pass of the geographic segment and over a small time period, they may be combined (e.g. averaged or otherwise aggregated) and considered a single distinct sample (or distinct measurement). The measurements from a pass of a segment are aggregated first as a pass aggregate. Thus, a pass aggregate may be considered a single distinct sample for a geographic segment.

The distinct sample (pass aggregate) from each pass of a particular geographic segment may be further aggregated to obtain baseline information or other information related to the environmental quality for this geographic segment during the time interval for which environmental data is monitored. The baseline represents typical conditions for the region. The baseline may be a mean, a geometric mean, a median, or any other summary statistic(s) for particular environmental constituents, such as $O_2$, $NO_2$, $O_3$, $NH_3$, $CH_4$, and/or PM 2.5 (particulate matter having a diameter of less than 2.5 micrometers). The baseline may provide valuable information about environmental conditions at a hyper-local resolution (e.g. at the resolution of a geographic segment or smaller). The data may also be processed to provide other information related to the environmental quality. The processed environmental data, such as baselines for geographic segments in the geographic region, may be presented in the context of a map, a table, or other format. For example, if presented in a colored map, road segments colored red may have a higher baseline amount of a particular pollutant than road segments colored yellow or blue.

In order to provide the baseline, otherwise analyze the environmental data and present the information, the number of times a particular geographic segment should be visited, the timing of the visits, and/or the paths used for the mobile sensor platforms (e.g. the times and/or orders of the visits to multiple geographic segments) are desired to be determined. Thus, the routes for mobile sensor platforms 102, which include the number of passes for each geographic segment, are desired to be determined. In some embodiments, the routes also include the timing (e.g. morning(s), afternoon(s), and/or night(s)) of the passes for each geographic segment for which data is collected. In some embodiments, all geographic segments for which data is taken have the same number of passes. In some embodiments, geographic segments for which data is taken may have different numbers of passes. In some embodiments, all geographic segments in a geographic region have data taken (i.e. have at least one pass). In some embodiments, only some of the geographic segments in a geographic region have data collected (i.e. some geographic segments have no passes). The routes are desired to be configured such that sufficiently precise data is obtained without incurring undue costs and without generating significantly more data than can be processed in a desired amount of time. The measurement of multiple pollutants is used as an example to illustrate the technique. The same technique can be applied to a variety of environmental conditions.

Figure 2:
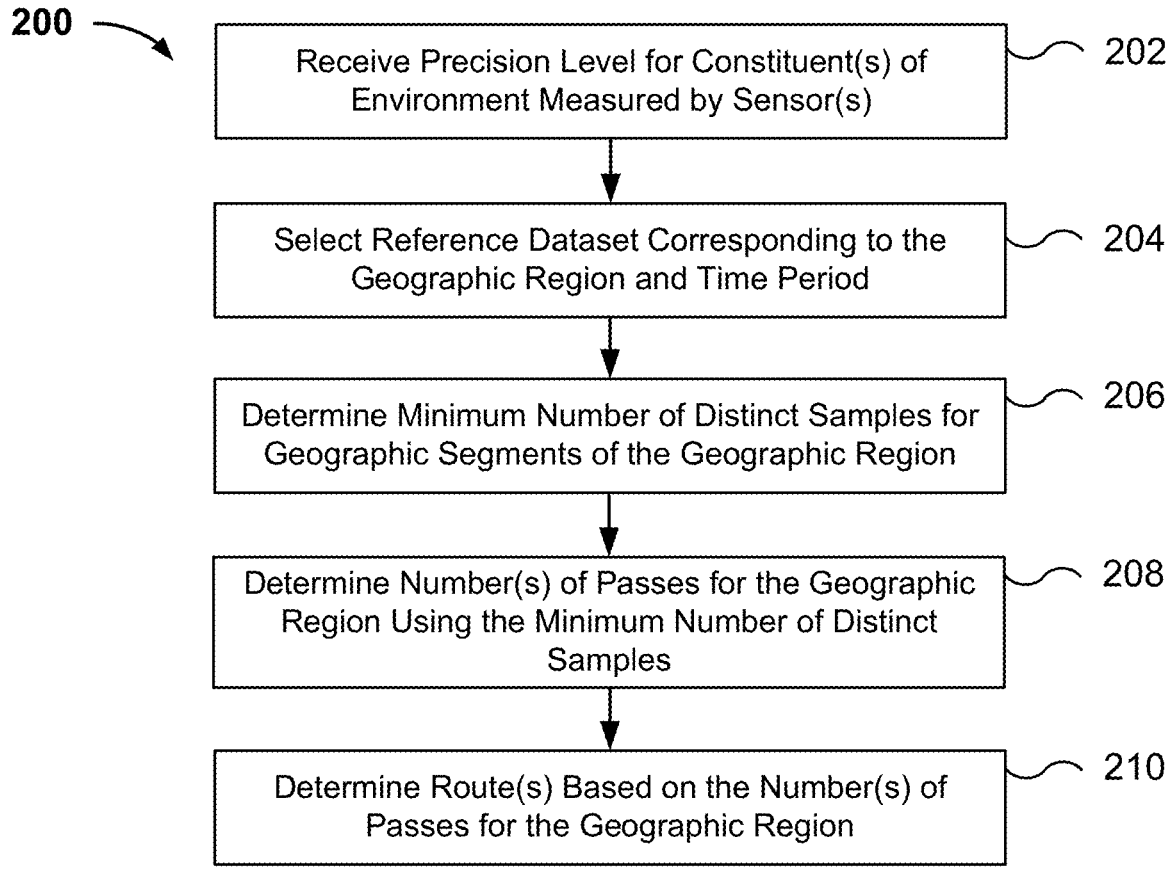
FIG. 2 is a flow-chart depicting an embodiment of a method for routing a mobile sensor platform for capturing environmental data.

FIG. 2 is a flow-chart depicting an embodiment of method 200 for routing a mobile sensor platform for capturing environmental data. Method 200 is described in the context of system 100 and mobile sensor platform(s) 102, but may be performed using other systems. For clarity, only some portions of method 200 are shown. Although shown in a sequence, in some embodiments, processes may occur in parallel and/or in a different order.

Method 200 determines the route through a geographic region for one or more mobile sensor platforms over a time interval. In particular, method 200 may be used to determine at least the number of passes for one or more geographic segments. Thus, much of method 200 is focused on a portion of routing of sensors for collecting environmental data and obtaining the desired precision level for the mean (i.e. some measure) of one or more constituents of the environment. As used herein, therefore, determining a route includes determining the number of passes (or visits) to geographic segment(s) of an area of interest. In some embodiments, method 200 may also determine other aspects of the route, such as the timing of the passes, the order of the geographic segments in a path, and/or other features of the technique used for sampling environmental data in the geographic region. The time interval may be provided by a user or interested party. In some embodiments, the time interval is a year and may be used to provide an annual baseline. Other time intervals, such as a quarter (3 months) a month, a week, a day and/or other time periods may be used.

A precision level for a mean concentration over the time interval of at least one constituent of an environment measured by a sensor of the sensor platform is received, at 202. For example, the desired precision level for the annual mean of NO may be the same as or different from the desired precision level for the annual mean of PM 2.5. One or both of these precision levels are received at 202. In some embodiments, the precision level is based on a tolerance in a relative error rate and a false positive error rate. In some embodiments, the precision level itself is received at 202. In some embodiments, the precision level is considered to be received because the precision level is determined based on received precision levels such as the tolerance in the relative error rate and the false positive error rate. The mean concentration level is a measure of the prevalence of the environmental constituent(s) over the time interval. Thus, although termed a concentration (e.g. a relative amount), another measure such as an absolute amount might be used. The term concentration includes both relative amounts and other measures of prevalence of the constituent(s). In some embodiments, the mean concentration level may be a mean, a median, a geometric mean, or any other summary related to the level of the particular environmental constituent.

A reference dataset corresponding to the geographic region and the time interval is selected, at 204. The reference dataset may include one or more of stationary sensor site data (e.g. the EPA's central site data for one or more central sites in the geographic region), satellite data (e.g. weather satellite data), stationary sensor network data, modeled data, other mobile sensor data, and/or other data. Although used in method 200, the reference dataset may be considered unusable for assessing the environmental quality in the geographic region for one or more reasons. For example, the reference dataset may include data that is consistent with larger spatial scales used in regulatory networks, weather prediction, and similar applications. Generally, the reference dataset does not include hyperlocal information for the entire geographic region. Thus, the reference dataset may not adequately capture the hyperlocal variability in the environmental quality. A particular reference dataset may also present other challenges. For example, data for some constituent of the environment that is of interest may be missing from the reference dataset. In some embodiments, the reference dataset includes data having a sensitivity level that is less sensitive than a desired sensitivity level or which is not sufficiently reliable (e.g. the sensor sensitivity level of the sensor(s) in the mobile sensor platform(s)). For example, low cost stationary networks may be less sensitive than desired and/or more unreliable than desired for an assessment of environmental quality. Thus, even if the temporal and geographic extent and resolution of the low cost stationary sensor network data is sufficient, the sensitivity or reliability may not be. However, the reference data set may still be used in method 200. It is desirable, however, that the reference dataset from the low cost stationary network be sufficiently sensitive that changes in the amounts of environmental constituent(s) of interest are still present. Similarly, data from EPA central site(s) may be used for the reference dataset. This data is typically sufficiently sensitive, though voluminous. However, because the sensor platform is stationary, the EPA central site data may not sufficiently capture geographic variations in the data throughout the geographic region. Similarly, satellite data may provide environmental data, but the spatial resolution could be coarse, may not indicate the variations of the data with altitude, and may not have data for times when it is dark or cloudy. Thus, by itself, satellite may not be adequate for the desired hyperlocal environmental assessment in some cases.

The reference dataset corresponds to the time interval, but measurements may be collected at earlier time(s). For example, the reference dataset may cover a time period that is prior to or overlaps only partially with the time interval of interest. Thus, for a time interval of a year, the reference dataset may be for a prior year or a year of time that commences prior to the time interval (e.g. for a year starting eleven months before the time interval of interest). Further, other characteristics of the reference dataset may be used in the selection at 202. For example, if the geographic region is expected to be dry and subject to wildfires during the time interval, then a reference dataset for a time period in which there were a corresponding number of wildfires may be selected or more heavily weighted.

Although 202 is described in the context of selecting a single reference dataset, in some embodiments, multiple sources may be used for the reference dataset. For example, the EPA's central site data may be used in conjunction with mobile data and/or low cost sensor network data. Further, different sources of the reference data may have different weights. For example, near the EPA's central site, this data may be heavily weighted. Low cost sensor network data and mobile data may be weighted less heavily. For regions far from the EPA's central site and/or separated by significant variations in the terrain, nearby low cost sensor network data and/or mobile data may be more heavily weighted while EPA's central site data may be less highly weighted.

From the reference dataset and the precision level, minimum number(s) of distinct samples (e.g. aggregate passes) for geographic segments of the geographic region are determined, at 206. Stated differently, the number(s) of visits to each geographic segment that results in the desired precision level for the mean concentration level over the time interval are determined for the constituent(s) of the environment of interest. The minimum number of distinct samples may differ between geographic segments and/or between constituents of the environment that are of interest. For example, at a particular road segment, NO may require more distinct samples for the desired precision level for the annual mean of NO than $NO_2$ does for the desired $NO_2$ precision level of its annual mean. Similarly, a particular road segment may have a larger minimum number of passes (distinct samples) to provide the desired precision level for a constituent of the environment than another road segment. For example, a road segment near a varying source of methane may have a higher minimum number of distinct samples to provide the desired precision level than a road segment far from any methane source. In some embodiments, determining the minimum number(s) of distinct samples accounts for a sensor measurement error. For example, if a sensor has a higher intrinsic error rate, the minimum number of distinct samples determined using the precision level may be increased. In some embodiments, the reference data may be stratified to determine the minimum number(s) of discrete samples. Thus, based on the minimum number of distinct samples and, possibly, other factors such as stratification of the data, the number of visits to each segment is determined. One such example is discussed below.

Based on the minimum number(s) of distinct samples, a number of passes for the geometric segments of the geographic region over the time interval is determined, at 208. In some embodiments, the number of passes may be the largest minimum number of distinct samples for all constituent(s) of the environment that are of interest for which data are collected. For example, $NO_2$, PM 2.5, and $O_3$ may be the constituents of interest. The minimum number of distinct samples for each are 28, 20, and 30, respectively, for one geographic segment. The number of passes in such a case is 30. In some embodiments, the number of passes is the minimum number of distinct samples for a particular constituent that is of most interest. In the example above, if PM 2.5 is of greatest interest, then the minimum number of distinct samples may be 20. In some embodiments, the number of passes is the minimum number of passes plus some number of passes that may reduce errors and/or improve data collection in another manner. Each pass of the number of passes is part of a route for the vehicle.

In some embodiments, determining the number of passes at 208 further includes determining, using the reference dataset, a time period for each pass of a geographic segment. In some embodiments, the time period is twenty-four hours. A pass that corresponds to the variation in the environmental data is selected from within the time period. For example, based on the reference dataset, it may be determined at 208 that at least some of the passes should be done from 5 AM-9 AM and 3 PM-7 PM (e.g. during workday traffic) in order to capture variations in the environmental data.

Route(s) are determined based on the number of passes, at 210. For example, a particular geographic segment that has a low number of passes may be placed on a different route than another geographic segment that has a high number of passes. In another example, the same route may traverse a geographic segment having a high number of passes multiple times, but traverse a geographic segment having a low number of passes once. Routes may also be determined based on the time period of 208, the layout of the geographic segments of interest (e.g. the paths that are possible to follow), as well as other factors. The mobile sensor platforms then traverse the routes to provide the number of passes. While on the route, the mobile sensor platforms sense levels of various constituents of the environment as well as the position (e.g. through GPS unit 145). Consequently, environmental data and position data are collected on the route and processed to provide an environmental assessment that links environmental data and geographic location.

Method 200 may also be understood in the context of a precision level based on the relative error and false positive rates as follows. The discussion herein relates to determining the mean pollution level. The mean pollution level is the most common aggregate being used to inform the pollution condition. However, other levels of other and/or additional environmental constituents may be used. The case of random sampling and then stratified sampling are disclosed.

A designated sampling area (i.e. the geographic region) and a designated time period (i.e. the time interval) are specified for an environmental assessment of one or more constituents of the environment. For example, the geographic region may be a city (e.g. the city of San Mateo, Calif. may be the geographic region). The environmental assessment may be a quarterly baseline map (i.e. a time interval of three months such as June-August) of PM 2.5 (i.e. the constituent of the environment of interest is PM 2.5). Consequently, environmental data for the city for PM 2.5 is desired to be collected for three months. In addition, suppose that the geographic segments for the geographic region are road segments having the lengths described herein.

The time interval over which environmental data is desired to be collected is continuous. However, for the purposes of defining the route (including determining the number of passes), the time interval is considered to include N discrete time points (e.g. N discrete intervals), where N can be arbitrarily large (e.g. discrete intervals that may be arbitrarily small in time). Thus, n distinct samples are to be drawn from the N discrete time points to infer the average pollution level or other feature of environmental quality for each geographic segment. The minimal n for satisfying a particular precision level is desired to be determined. In other words, the n being determined is the minimum number of distinct samples for the precision level. Statistically, N is the population size and n the minimum number of distinct samples.

The precision level may be defined at 202 based upon the relative error rate and the false positive (type I) error rate in some embodiments. Thus, the relative error rate and the false positive error rate may be provided at 202. $Y_i$ is considered to denote the true pollutant level of a geographic segment at timestamp/discrete time interval i, i=1, 2, . . . , N. The variable $\mu$ is the mean of Y and $\hat{\mu}$ is an estimate of $\mu$. The variable $\gamma$ is a tolerance level of the relative error rate for $\hat{\mu}$ and $\alpha$ is the false positive rate allowed. The precision level for $\hat{\mu}$ may be given by:

$$P(|\hat{\mu}-\mu|\geq\delta\mu)\leq\alpha, \quad (1)$$

Thus, equation (1) is the precision level determined at 202 from the relative error rate $\gamma$ and the false positive rate $\alpha$ provided. Consequently, there is a (1-$\alpha$) probability that the estimate does not deviate from $\mu$ by $\pm\gamma\times100\%$. For example, the type I error rate $\alpha$ may be 0.05 and the relative error rate $\gamma$ may be 0.35. The precision level can also be interpreted as that the 95% confidence interval (CI) of the estimate of the average pollution concentration level for a road segment will be within [65% $\mu$, 135% $\mu$]. Thus, the minimum number of distinct samples, n, such that a sample aggregate $\hat{\mu}$ satisfies (1) is desired to be determined. In addition, it is desired to be determined how to allocate the n passes to time windows so that a smaller n may satisfy (1) than a random allocation.

In addition, $\mu$, that is based on $Y_i$=1, 2, . . . , N from discrete time points, is considered to represent the average pollution level for the entire (continuous) time interval. This is reasonable when N is large. Depending on how frequent a sensor measures and how fast a vehicle containing a mobile sensor platform drives each road segment, multiple measurements could be taken when a car passes a road segment. Each road segment is also defined to be sufficiently short that the spatial variation of the true pollutant levels within a road segment is ignorable. The aggregate (often the mean) at the pass level is treated as one measurement (i.e. a distinct sample) and the start time of each pass may be used as the single timestamp for this measurement.

A reference dataset is selected to determine n, at 204. For example, data from the EPA's central site closest to a driving area (at least part of the geographic region for which environmental data is to be collected) may be selected. Other data (e.g. modeled data, other historical data, and/or current data) may be used in addition to or in lieu of such historical data. The driving area may contain one EPA central site because these sites are sparsely located. If there are more than one EPA central sites within a driving area, the driving area is divided into multiple smaller sub-areas to ensure one area only contains not more than one EPA central site. If a driving area does not contain any EPA site, then a nearby EPA site is assigned to the geographic region. For example, the centroid of this area may be calculated and the EPA central site that has the smallest distance to the centroid may be selected as the reference dataset source. Other mechanisms for selecting the EPA central site may be used. Further, other sources of reference data may be used in addition to or in lieu of the EPA central site. The data from the EPA central site(s) in the geographic region is obtained during a time period analogous to the time interval in the historical years. In the example above, the time interval may be June-August the current year. The data from the corresponding EPA central site(s) for June-August in one or more previous years is selected as the reference dataset. In some embodiments, the data for different years may be weighted. For example, years that are closer in time to the time interval may be given a higher weight. Years having weather (e.g. temperature, rainfall, and/or humidity) that is analogous to the weather expected for the time interval may be used. These data are used to determine the minimum number of distinct samples. In some embodiments, users/customers are allowed to decide which historical years they are interested in using. In some embodiments, the past three years are used.

The variable $\bar{Y}_{rs}$ denotes the sample average from random sampling. The notation "rs" indicates random sampling:

$$\bar{Y}_{rs}=\frac{\sum Y_i}{n}$$

Then (1) becomes:

$$P(|\bar{Y}_{rs}-\mu|\geq\gamma\mu)\leq\alpha \quad (2)$$

When the minimum number of distinct samples n is large enough, $\bar{Y}_{rs}$ tends to be normally distributed:

$$\bar{Y}_{rs} \sim \mathcal{N}(\mu,\sigma^2/n) \text{ as } n\rightarrow\infty \quad (3)$$

where σ is the standard deviation of $Y_i$, i=1, 2, . . . N. Based on (3) and (2), the n that satisfies the desired precision level may be given by (γ,α) is:

$$n \geq \left(\frac{t_{1-\alpha/2}s}{\gamma\mu}\right)^2 \Big/ \left[1 + \frac{1}{N}\left(\frac{t_{1-\alpha/2}s}{\gamma\mu}\right)^2\right]$$

where $t_{1-\alpha/2}$ is the critical value of the t distribution at (1−α/2) percentile and s is the estimate of the standard deviation σ. Usually the term involving 1/N can be ignored if the sampling fraction defined by n/N is less than 5% or even 10%. When this correction is ignored, the above equation becomes:

$$n \geq \left(\frac{t_{1-\alpha/2}}{\gamma\mu}\right)^2 s^2 \quad (4)$$

A typical designated time period for monitoring data is greater than three months (in other words more than $7.9\times10^6$ seconds). Each pass (e.g. visit to a geographic segment) takes approximately 10-20 seconds (given a particular length of a road segment and driving speed). The maximum number of passes that is affordable for each road segment generally does not exceed a few hundred passes due to operation costs. Therefore, the sampling fraction is much less than 5% and the simple form (4) for computing n applies.

To determine the minimum number of distinct samples, the central site data (i.e. reference dataset) is used to estimate μ and σ of the hourly aggregates during this period in each historical year separately. Based on a specified tolerance error rate γ and the type I error rate α, applying equation (4) the minimum number of distinct samples n is determined. This procedure may be repeated for each historical year and the average over multiple years is determined as the final target passes. Because the sampling scheme we consider is random sampling, the time of visit to a segment for these n number of passes may be considered to be randomly assigned to any time during the monitoring period.

The minimum number of distinct samples depends on the error tolerance, the false positive rate determined to be acceptable, and the temporal variability of all the potential measurements at a road segment (as determined using the historical, or reference, data). Based on equation (4), if the temporal variability of a pollutant is large, a user's error tolerance is low, and the acceptable false positive rate is small, then the target passes is large.

Thus, the minimum number of distinct samples, n, may be determined from the reference dataset, at 206. At 208, the number of passes for the geographic region is determined based on n. Thus, the number of passes for the geographic region is some function of the number of passes determined for each geographic segment in the geographic region. For example, if each geographic segment in the geographic region might has the same minimum number of distinct samples, then the number of passes for the geographic region may be equal to the minimum number of distinct samples. In some embodiments, therefore, the number of passes is simply n. However, if multiple constituents are desired to be measured (i.e. $n_j$ is determined for j different constituents), then the number of passes may be different for a particular $n_j$ for each geographic segment. For example, the highest $n_j$ for each geographic segment may be used in determining the number of passes, the $n_j$ for the constituent of most interest in each geographic segment may be used in determining the number of passes, or $n_j$ plus or minus some factor (e.g. ten percent) may be used. In some embodiments, therefore, the number of passes for the geographic region is selected such that the desired minimum number of distinct samples is collected for each geographic segment.

Thus, the number of passes for a geographic region and geographic segments therein may be determined. The routes for mobile sensor platforms may then be determined based on the number of passes. Because the minimum number of distinct samples is used to determine the number of passes, and thus the route, the desired level of precision may be obtained. In addition, because environmental data collection is tailored to the precision level, the amount of extraneous data collected as well as the time taken to collect the data may be reduced. Thus, data collection may be accomplished efficiently.

Pollutant and other environmental data levels often exhibit a diurnal, a day-to-day, seasonal, or other predictable variation. These temporal variabilities could be caused by the temporal dynamics of the source of a pollutant or other constituent of the environment, meteorological events, the change of the height of the mixing layer, or other reasons. Thus, the population of samples may be heterogeneous. Consequently, determination of the minimum number of distinct samples may be desired to take into account the heterogeneous nature of the reference data set and thus the expected heterogeneous nature of the environmental data to be collected.

Figure 3:
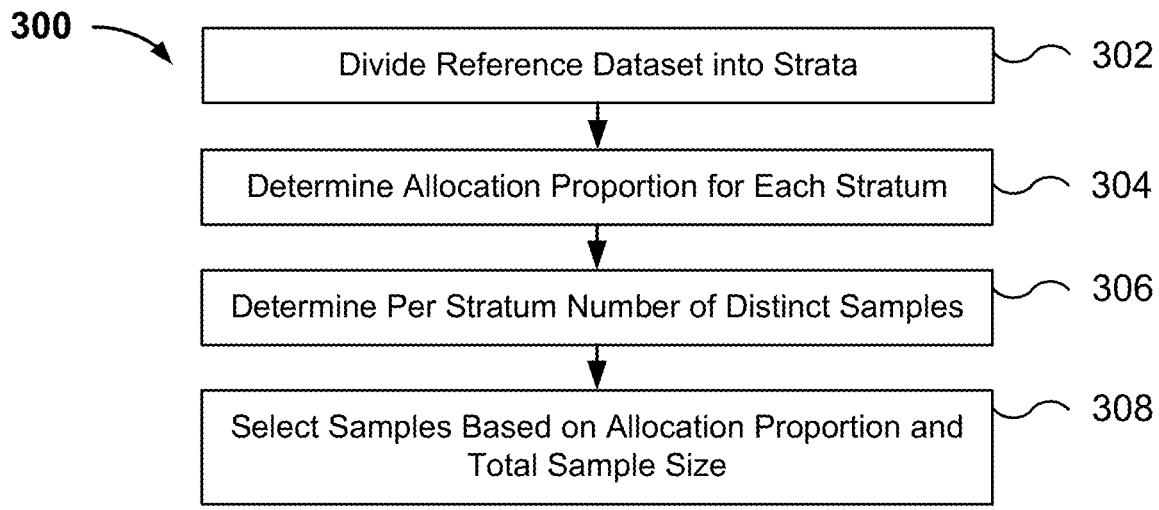
FIG. 3 is a flow-chart depicting an embodiment of a method for determining a minimum number of distinct samples for routing a mobile sensor platform to capture environmental data.

FIG. 3 is a flow-chart depicting an embodiment of method 300 for determining a minimum number of distinct samples for routing a mobile sensor platform to capture environmental data. Method 300 is described in the context of system 100 and mobile sensor platform(s) 102, but may be performed using other systems. For clarity, only some portions of method 300 are shown. Although shown in a sequence, in some embodiments, processes may occur in parallel and/or in a different order. Method 300 may be used in embodiments in which the number(s) of distinct samples is determined utilizing strata. For example, if the presence of a particular constituent of the environment is heterogeneous (e.g. over time) as described above, the time interval may be divided into strata. Thus, use of the reference dataset in determining the minimum number of distinct samples may also utilize strata. Each of the strata includes a subpopulation size and corresponds to a portion of the time interval. Samples are selected from each of the strata. The minimum number(s) of distinct samples is from the samples from each of the strata.

Thus, the reference dataset (selected at 204) is divided into strata, at 302. Each strata includes data that is relatively homogeneous. The allocation proportion for each stratum is determined, at 304. The allocation proportion is the fraction of distinct samples desired from each stratum. The per stratum number of distinct samples for the precision level (from 202 of method 200) is determined based on the allocation proportion and the total sample size (i.e. the total number of samples for all strata), at 306. Samples (sampling time) are selected randomly from each stratum, at 308. The minimum number of distinct samples for each stratum may be used in routing mobile sensor platforms 102. The efficiency of routing mobile sensor platform 102 may thus be improved.

Use of strata in method 300 may be understood as follows. When a population is heterogeneous, dividing this population into relatively homogeneous subpopulations and then combining the estimate of each subpopulation mean can give a more precise estimate of the population mean as compared to that obtained directly from a random sample of the population. The allocation of sampling size (the total minimum number of distinct samples) to different time strata may also reduce cost reduction. The stratification of the reference data may also create homogeneous subpopulations, which can be estimated more precisely with (potentially) fewer passes through stratified sampling than a simple random sample of the whole population. Thus, stratified sampling may be performed in operation. In some embodiments, the desired stratified sampling may be determined as follows. The population for the reference dataset is divided, at 202. In other words, the time interval is divided into H strata. $N_h$, h=1, 2, ..., H denotes the subpopulation size (e.g. the number of discrete intervals) for each stratum. Thus, the total population size is $$N = \Sigma_{h=1}^{H} N_h$$

Next at 304, $n_h$, the number of distinct samples is selected within each stratum from $N_H$. The number of distinct samples selected may be random or may be accomplished using some other mechanism. The total minimum number of distinct samples is $$n = \Sigma_{h=1}^{H} n_h$$

$\overline{Y}_{ss}$ denotes the stratified sampling estimator and $W_h = N_h/N$ where the notation "ss" is short for stratified sampling. Then $$\overline{Y}_{ss} = \Sigma W_h \overline{y}_h$$

Where $\overline{y}_h$ is the sample average for each stratum.

Further, $s_h$ is the estimate of the standard deviation of Y with the stratum h. The finite sampling correction is ignorable in some embodiments, as explained above. It follows from [1] that the minimum number of distinct samples is given by:

$$n = \left(\frac{t_{1-\alpha/2}}{\gamma\mu}\right)^2 \sum_{h=1}^{H} W_h^2 s_h^2$$

The minimum number of distinct samples may be obtained when the allocation ratio $w_h$ defined as $n_h/n$ follows the optimal Neyman allocation. Thus, the optimal sample size for each stratum h is therefore determined by:

$$n_h = nw_h = n \frac{N_h s_h}{\sum_i N_i s_i} \quad (5)$$

This result provides the minimum number of distinct samples under the stratified sampling to reach the desired precision level defined by ($\gamma, \alpha$), at 306.

When the Neyman allocation is used, the variance of $\overline{Y}_{ss}$ is minimized. In other words, the Neyman allocation may yield the minimum number of distinct samples that satisfies the desired precision threshold. Under Neyman allocation, it can be determined that the minimum number of distinct samples is:

$$n = \left(\frac{t_{1-\alpha/2}}{\gamma\mu}\right)^2 \left(\sum_{h=1}^{H} W_h s_h\right)^2 \quad (6)$$

Comparing (6) to (4), if the average of the within stratum standard deviation $E_{h=1}^{H}(W_h s_h)$ (6) is less than the total standard deviation of the population, then the minimum number of distinct samples n in (6) from the stratified sampling is smaller than that in (4) from the random sampling. If sampling efficiency of a sampling design is defined as the minimum number of distinct samples to reach a certain precision threshold, then stratified sampling may be more efficient than the simple random sampling when the population is heterogeneous. The strata construction would be effective if it divides the population into homogeneous subpopulations. Using equation (5), the optimal target passes for each stratum may be obtained. In practice, it may be rounded up to the nearest integer, and the total of the target passes of each would be calculated stratum to provide the total target passes.

Thus, the minimum number of distinct samples to be collected for a geographic segment (and thus for a geographic region) may be provided for a heterogeneous population. Because strata are used, the minimum number of distinct samples to be collected may be reduced over random sampling. For example, the reference dataset may indicate that a road segment has a high amount of $NO_2$ from 5 AM-9 AM and from 5 PM-7 PM, a lower amount of $NO_2$ at other times during the day (e.g. 9 AM-5 PM) and very low amounts of $NO_2$ at night (e.g. 7 PM-5 AM). Thus, the reference dataset is broken into four strata: 5 AM-9 AM, 9 AM-5 PM, 5 PM-7 PM and 7 PM-5 AM. Samples may be taken from each of the four strata. Given the precision level described herein, the number of distinct samples per stratum may be determined by following (5) for each of the four strata. The per stratum number of distinct samples is likely to be different for different strata. For example, more samples may be taken in the 5 AM-9 AM stratum than in the 5 PM-7 PM stratum. The total number of distinct samples is the sum of per stratum number of distinct samples. This total number of distinct samples may be less than what would be determined if random sampling is assumed. Thus, the number of passes determined at 210 may be reduced. In addition, the timing of the passes can be set to provide the appropriate number of passes per stratum. Instead of randomly sampling a geographic segment throughout the twenty-four hours of a day, determining the number of distinct samples per stratum and the total number of distinct samples may result in environmental data having the desired precision using a smaller number of passes. Consequently, data collection is more efficient. In addition, large volumes of extraneous data may not be collected. Processing of the environmental data is thus also made more efficient. Performance of a data collection system (e.g mobile sensor platforms 102) and a data processing system may be improved.

In some embodiments, a target variable may also be selected. A target variable may be selected because an optimal (e.g. desired) sampling scheme for one pollution species may not be optimal for another pollution species. The target variable is defined as the variable (e.g. constituent) among all the constituents in the environment that is considered to have the highest priority for optimizing the number of measurements by its sensor. Thus, as discussed above, the target variable may be used to determine the number of passes based on the minimum number of distinct samples. In some embodiments, the target variable is determined to be the pollutant that requires the largest n under random sampling when the same precision level is used because if the precision of the mean concentration for the pollution species that requires the largest n is reached then the precision level for other pollution species will be reached automatically. The minimum number of distinct samples calculated under stratified sampling is not used to determine the target variable in some embodiments because the result would be sensitive to how the designated time period is stratified. This adds extra complexity. However, in some embodiments, this stratified sampling and/or other mechanism(s) may be used in determining the target variable.

Figure 4:
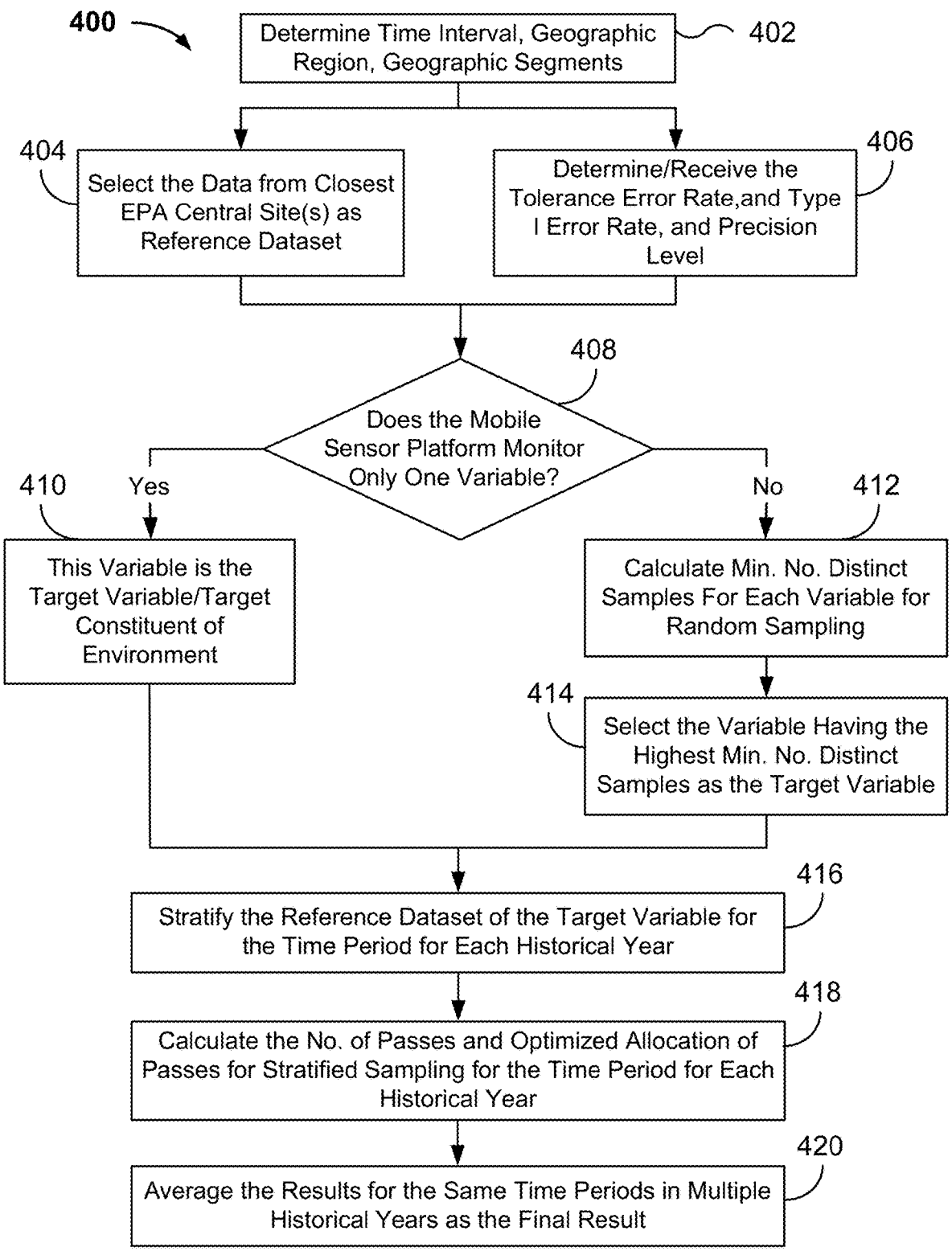
FIG. 4 is a flow-chart depicting an embodiment of a method for determining a target variable.

For example, FIG. 4 is a flow-chart depicting method 400 for determining a target variable, which may be used in defining the route(s) for mobile sensor platforms such as mobile sensor platforms 102. Method 400 is described in the context of system 100 and mobile sensor platform(s) 102, but may be performed using other systems. For clarity, only some portions of method 400 are shown. Although shown in a sequence, in some embodiments, processes may occur in parallel and/or in a different order.

The time interval, geographic region, and geographic segments are determined, at 402. For example, the city or other geographic region for which environmental data is of interest, how the geographic region is separated into components (e.g. roads and road segments), and what time interval is of interest (e.g. a quarter or a year) are determined. At 404 and 406, the reference dataset is selected and the precision level, tolerance error rate, and Type I error rate are received or determined. At 408, it is determined whether the mobile sensor platform, such as mobile sensor platform 102, senses data for only one constituent of the environment (i.e. monitors only one variable). For example, if there is only one constituent sensed by the mobile sensor platform, then at 410, this constituent of the environment is determined to be the target variable. If the mobile sensor platform senses multiple constituents, then the minimum number of distinct samples for each variable (each constituent of the environment sensed) is determined, for example via 206 of method 200. To do so, the reference dataset selected at 404 and at least the precision level of 406 are used. The variable having the highest minimum number of distinct samples is selected as the target variable because if the precision level for the constituent that requires the largest number of distinct samples is reached then the precision level for constituents will be reached automatically. Thus, the number of passes and the route are calculated using this variable.

Method 400 also takes into account the availability of multiple historical years of data. Data from a reference site's historical measurements for multiple years could be used to generate the reference dataset. Thus, the reference dataset is stratified for each time period (e.g. the same time period for each historical year in the reference dataset) at 416. At 418, the number of passes and allocation of passes may be determined for each stratum and each time period in each historical year. In some embodiments, the number of passes is the same as the minimum number of distinct samples. In some embodiments, the number of passes might be adjusted up or down from the minimum number of passes, for example based on factors other than providing a particular precision level. For example, the minimum number of distinct samples may be clustered around the hours of 5 AM-9 AM and 5 PM-7 PM on weekdays. The passes may also be clustered around these strata. Thus, 418 may use a process analogous for that described for methods 200 and 300. In addition, the results per time period in each historical year may be averaged, at 420. Thus, an average number of minimum number of distinct samples, an average number of passes, and/or an average allocation of the passes may be provided. The routes may be provided (e.g. at 210) using the averages determined at 420.

Thus, both random and stratified sampling of a reference dataset may be used to determine the minimum number of distinct samples to provide a desired precision level for one or more constituents of interest. The number of passes may also be provided, particularly for target variables (i.e. the constituent of most interest to a user). A route may then be determined for the mobile sensor platform, such as mobile sensor platform 102. Thus, environmental data may be collected to provide the desired precision level for the constituent of the environment that is most important to the user. This environmental data may be processed and linked to sensed position data (e.g. from GPS unit 145). Thus, hyper-local (e.g. by geographic segment or geographic region) knowledge of environmental quality at the desired sensitivity and precision level may be obtained. Consequently, an environmental assessment of conditions may be more readily made.

For example, among the environmental constituents that mobile sensor platform 102 may monitor, not all the pollutants are equally important for all users. Thus, the target variable may be chosen from the pollutants of the most interest to the user. For example, $NO_2$, $O_3$, and PM 2.5 may be the most interesting pollutants to a set of users. The precision levels and reference data set may be provided and selected, at 406 and 404, respectively. The minimum number of distinct samples are computed for these three pollutants using the same sets of $\gamma$ and $\alpha$ but different sets of $\hat{\mu}$ and $s^2$ that are estimated respectively from the reference data set (i.e. historical EPA central site data for each pollutant), at 412. In some cases, PM 2.5 may be determined to have the largest n among the three pollutants of the most interest to the user. Thus, at 414, PM 2.5 is determined to be the target variable. For the same pollutant, $\hat{\mu}$ and $s^2$ vary by monitoring periods and monitoring areas of interest. Another target variable may be selected for different times and locations. The procedure described above may be performed using PM 2.5 historical data only to determine the final target passes and optimal allocation ratio to different time strata.

As indicated in equation (6), if the stratification fails to adequately control $s_h$ for one of the h stratum, the minimum number of distinct samples n may be large. Thus, stratification choice itself can affect the precision of $\overline{Y}_{ss}$ and the minimum number of distinct samples n. The strata construction may be most effective if the (heterogeneous) population can be divided into homogeneous subpopulations. Theoretically, the historical data can be clustered using non-supervised clustering technique and the strata found. For example, this clustering may be used at 302 and/or 416. In practice, too many strata may be unaffordable because each stratum requires at least one sample and there is a maximum n that is affordable given real world constraints. In addition, each stratum in this case has a practical meaning. It covers certain hours of certain days during a monitoring period. If there is no consistency in hours and days among strata, it is difficult to manage the drivers and vehicles for conducting mobile monitoring.

Diurnal variation and seasonal variation are common phenomena for most pollutants. Therefore, the monitoring period may be stratified simply by hours of a day and month. Because normally a driver works eight hours per day for five days a week, each day may be divided into three strata of eight hours each. Since multiple pollutants that are monitored, such as NO, $NO_2$, and black carbon, are traffic related, the concentrations of these pollutants during the local rush hours are expected to be more similar to each other than to the rest of the day. The starting time of the rush hour could vary from one city to another. A conservative estimate may thus set the first stratum based on the hour from 5 AM each day, which results in three strata: 5 AM-1 PM, 1 PM-9 PM, and 9 PM-5 AM on the next day. In operation, these are three daily shifts a driver could be assigned to. Consequently, the night hours are grouped together during which certain pollutants are expected to vary at night. For annual baseline monitoring, each season of three months may be treated as one stratum. The same hour strata may be used throughout the year. In other embodiments, other strata may be selected. As a result, 12 strata are created based on the combinations of 4 intervals of day periods and 3 daily shifts. For quarterly baseline monitoring, each month may be treated as an individual stratum. Then 9 strata are created based on the combinations of 3 intervals of day periods and 3 daily shifts. Within each stratum, equal sampling probability is used for randomly selecting the time to visit a road segment; across strata, different probabilities are used based on the weights in (5). If operation restrictions are reduced, advanced clustering methods could be used to determine strata based on historical data.

To determine the target passes of a sampling area, the EPA central site nearby or within the sampling area may be identified as a reference dataset source. Based on the tolerated error rate and type I error rate, the minimum number of distinct samples for random sampling for each pollutant species among the major variables of interest are compared and the one requiring the largest number of samples is selected as the target variable. The target variable becomes the pollutant species the sampling design is optimized for. Then, the historical data of the target variable is stratified. The mean and standard deviation of the data within each stratum for each monitoring period are calculated. Using these estimates in (6) and (5), the allocation and the target passes are obtained. These may be averaged over historical years and used.

The techniques described, for example in methods 200, 300 and/or 400, considers the target number of passes as the same for the road segments within a sampling area. Different sub-regions of this group may experience different temporal variability. Thus, different sub-regions may be desired to have different target numbers of passes. Without distinguishing this difference, an opportunity to optimize the resource allocation is lost. Thus costs could be further reduced if the size of the area that is considered to share the same temporal variability is shrunk. Sub-region classification models based on topography, local weather patterns, the distance to the emission sources, road type (where data regarding intrinsically different levels of variability is available), even mobile sensing data and/or other parameters could be used for further optimizing the data collection scheme When the mobile sensing platform becomes more popular and widely adopted, it is possible that historical mobile sensing data (in lieu of or in addition to stationary sensor data) may be used initially for the reference dataset, or for updating the routes calculated. Reference datasets from the EPA central site (or other stationary sensors) have a drawback: the temporal variation levels of different road segments within an area are different due to factors such as a prevailing wind direction or localized pollution sources may not be captured as desired. Thus, without the use of mobile historical data and/or low cost sensor network data may be desired to be used in addition to or in lieu of EPA central site data. Because mobile sensors collect data from multiple road segments (e.g. every road segment or some fraction thereof), these data allow for potentially different demands of target passes for different road segments to be identified. However, unlike the central site data, mobile data have sparse temporal information of air pollution for each road segment. The data may be insufficient to estimate $\mu$ and $\sigma$, and $\sigma_h$ precisely in (4) and (6). One solution could be identifying a grid size and pooling all the data from the road segments within this grid together for estimating $\mu$, $\sigma$, and $\sigma_h$. Road segments belonging to this grid share the same target passes. The same procedure discussed above may be used to derive the target passes for each grid. As long as the grid size is smaller than the distance between two closest central sites, this alternative approach could be better than that using the central site as the historical data source.

Sometimes a geographic region does not have an EPA central site or other historical data available. For example, some developing countries or remote areas lack air quality regulation agencies and the attendant mechanisms for measuring air quality. In such cases, a low-cost stationary sensor that measures the air pollutant variables of the most interest may be installed. These data may be used in or as the reference dataset. In view of (4) and (6), the accuracy of the ratio between $\sigma$ and $\mu$ determines the accuracy of the minimum number of distinct samples and the number of passes. Although a low-cost stationary sensor may not capture the mean estimate $\mu$ as precisely as a research-grade sensor from an EPA central site, it is still possible that the ratio estimate is valid as this ratio is a relative value that has no unit associated with it. Since the mean and the temporal variation for different seasons are usually different, the low-cost stationary sensor may start operating and may collect data during the same monitoring period in a previous year. In some embodiments, adjustment for seasonal effect may be carried out on $\mu$ and $\sigma$ estimates. This adjustment factor could be potentially learned from existing central site data in available places if the seasonal adjustment factor does not vary much from place to place. After that, the same procedure in our proposed method could be used to derive the target passes.

In view of (4) and (6), the accuracy of the ratio between $\sigma$ and $\mu$ estimates determines the accuracy of the target passes. This ratio may be modeled as a function of relevant features such as latitude, longitude, wind patterns, land use, topography and/or other parameters, with training data from both historical mobile and stationary site data. Then if information on these features of a sampling area can be obtained, this ratio between $\sigma$ and $\mu$ may be predicted and the target passes and their time allocation estimated.

The measurement error of a sensing device in a vehicle is usually non-ignorable but is often known before designing a sampling. If measurement error is considered in the determination of the number of passes, then $s^2$ in (4) may be a combination of uncertainty due to measurement error and due to inherent temporal variability of air pollutants over a sampling period. It is reasonable to consider these two sources independent and the measurement error of the pass aggregate from pass to pass independent. Let $s_a$ denote the inherent temporal variability estimate. The measurement error is $s_e$ at the pass aggregate level and a segment is driven by n times, then:

$$S = \sqrt{s_e^2/n + s_e^2}$$

Thus, n may be solved iteratively when the above equation is used in conjunction with (4) or (6). After incorporating the uncertainty due to the measurement error, the same procedure in the proposed method could be used to derive the target passes. These new target passes then take into account the measurement of error.

Figure 5:
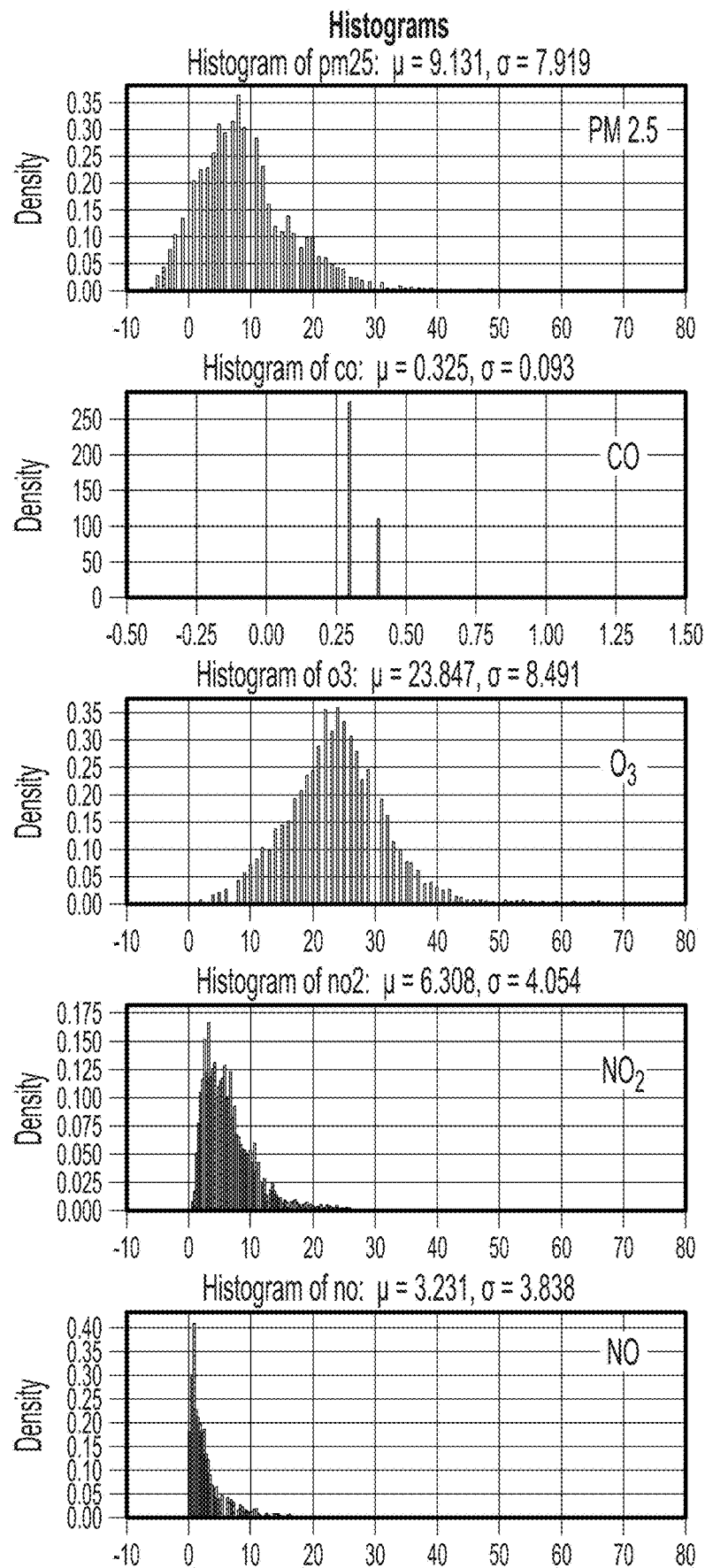
FIG. 5 depicts histograms of the concentration of a pollutant for a particular time interval and at a particular EPA central site.
Figure 5:
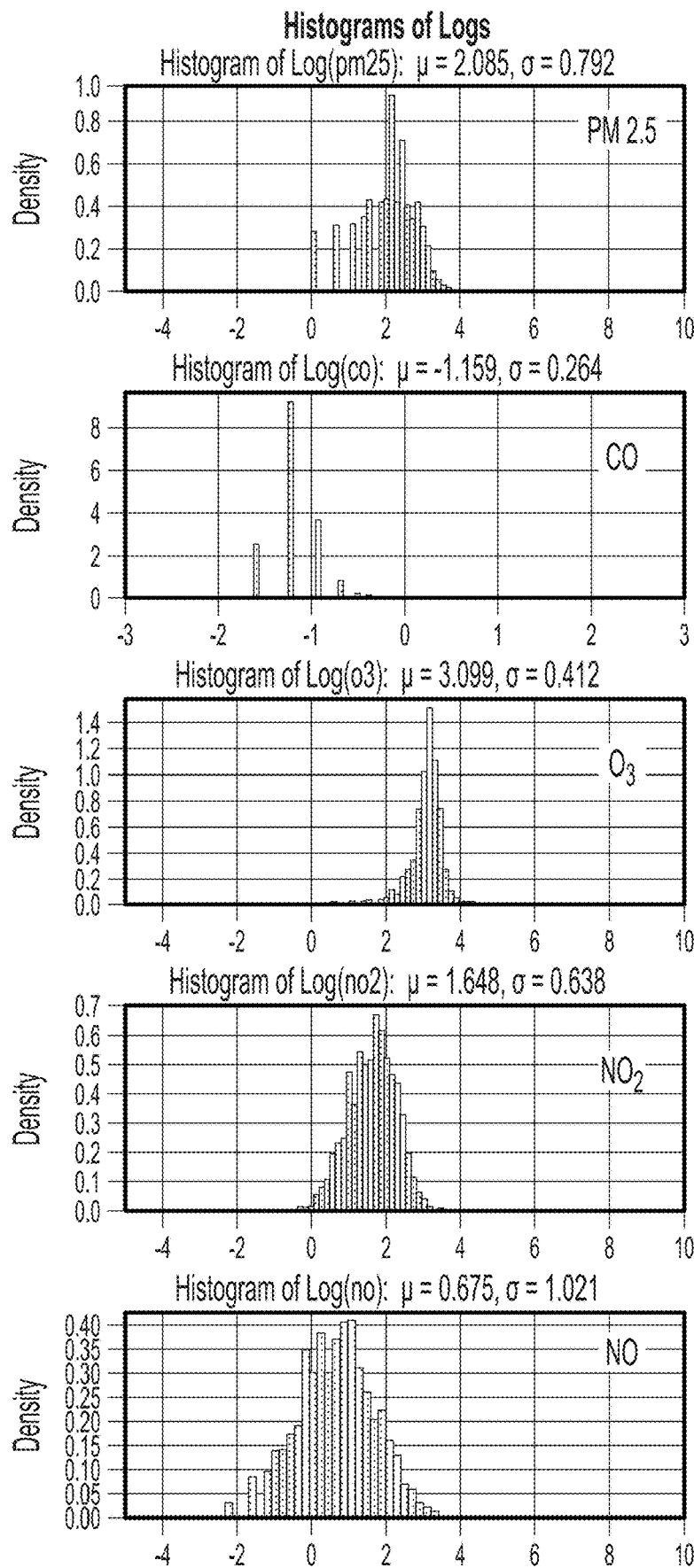

FIG. 5 depicts histograms of the concentration of a pollutant from June to September at a particular EPA central site. Thus, FIG. 5 may be considered to indicate a particular reference dataset. EPA central sites usually monitor six common air pollutants of concern, called criteria pollutants. They are: carbon monoxide (CO), lead, ground-level ozone ($O_3$), nitrogen dioxide ($NO_2$), particulate matter (PM), and sulfur dioxide ($SO_2$). Sometimes nitrogen monoxide (NO) and black carbon (BC). The distributions of the levels of hourly aggregates of these pollutants for a period of time at a central site are very different. For example, FIG. 5 shows the histogram of the pollutants monitored at a particular central site during June-September 2017. The left panel shows the histogram of the original data and the right panel shows the distribution after log transformation.

FIG. 5 indicates that $NO_2$ and NO are highly skewed and follow a log-normal distribution. For this type of data the mean constructed on the original scale with a small sample usually exhibits a large uncertainty. This could be explained by examining the asymptotic variance term in (3). Data with a highly skewed distribution usually has a large value of standard deviation. With a small sample size n, by (3) the asymptotic variance for the sample mean could be large. From a perspective of the precision of estimating a baseline metric, sample mean might not be the best choice as a baseline metric to inform the NO2 and NO pollution conditions. On the other hand, the distributions of NO and NO2 levels after log transformation are close to normal distributions, which means both the sample mean of log(NO2) and the sample mean of log(NO) are less subject to the influence of some large values.

Alternative baseline metrics could be considered for data with a pattern similar to NO and $NO_2$. For example, a geometric mean, which is calculated by first taking the average of the sample measurements on the log scale and then exponentiating the average back to the original scale, may be used. Consequently, the minimum number of distinct samples and the number of passes may be estimated based on the mean and variance of the data on their log scale. Note the precision level at the log scale should be calculated first before applying equations (4) and (6) for determining the target passes. If the tolerable error rate allowed for a baseline of geometric mean of a pollutant is $\gamma$, then the tolerable error rate of for data at their log scale could be obtained by $$\gamma_{log} = \frac{\log[(1+\gamma)\exp^{mean(\log X)}]}{mean(\log X)} - 1$$

Using $\hat{\mu}$, s and $s_h$ of the data on the log scale into (4) or (6) as well as $\gamma_{log}$, the target passes for the baseline of a geometric mean may be obtained. A symmetric confidence interval may thus be obtained for the sample mean for data at their log scale. This confidence interval may be robust to large values. The exponential functions of the lower and upper bounds of this confidence interval give an asymmetrical confidence interval for the geometric mean, shifting to the right. This may accurately describe the tendency of the uncertainty pattern of this summary statistic for variables exhibiting a skewed distribution as that of NO and/or $NO_2$.

When data can be approximated by a log-normal distribution, the geometric mean may be interpreted as the approximate of the median because a mean estimate is also a median estimate if the data at its log-scale closely follows a normal distribution. Because log transformation does not change the rank of each data point. A median on the log-scale remains a median after applying an exponential function, therefore the geometric mean could be interpreted as an approximate median.

Due to the measurement error, negative measurements can be observed. The geometric mean may be used as the baseline metric. These negative values are removed during the log transformation step. This causes the geometric mean estimate to be slightly biased upward. Such bias is generally very small since each data point from the EPA central site is an hourly aggregate of many measurements. After aggregation, the chance that a negative value is reported is low. Nevertheless, if the historical data on a pollutant is only slightly skewed, log-transformation may not be performed, for example, for the particulate matter in FIG. 5.

Alternatively, the median could be used as a baseline metric directly. In one embodiment, to find the target passes for having a required precision level for a sample median, simulations with different sample sizes could be performed. Within each simulated sample size, bootstrap could be used to obtain the confidence interval for the sample median of a specific n. Among all the n being tried, we select the one that above which our tolerable error rate is satisfied as the target passes.

In California, wildfire has happened more frequently in recent years. The temporal variation of certain pollutants (e.g. PM 2.5 and/or black carbon) for a year with an active wildfire season is larger than that for a year without wildfire. If the historical year data without wildfire is used to determine the target passes for a year with wildfire or the vice versa, then the estimation is generally incorrect. Therefore, users from areas prone to wildfire, or other large-scale but irregular pollution events, should consider choosing only the relevant historical years' data. Stated differently, the historical data used may be selected to better match current or expected conditions.

Each pass for a road segment may last about 10-20 seconds in some embodiments. However, the EPA central sites usually only share hourly aggregate data even though the measurement itself is at a one-second frequency. Therefore, the temporal variability from the EPA central site data may only provide information on hour to hour variation and may ignore the additional second to second variation. For some pollutants such as $O_3$, the second to second variation is small but for some modalities such as NO, the second to second variability may be large. Thus, potentially $s^2$ or $s_h$ in (4) and (6) are underestimated if the user does not have access to more time resolved data. A correction factor could be applied to adjust for this underestimation by comparing second-to-second variation and hour-to-hour variation using EPA central sites' raw data.

Figure 6:
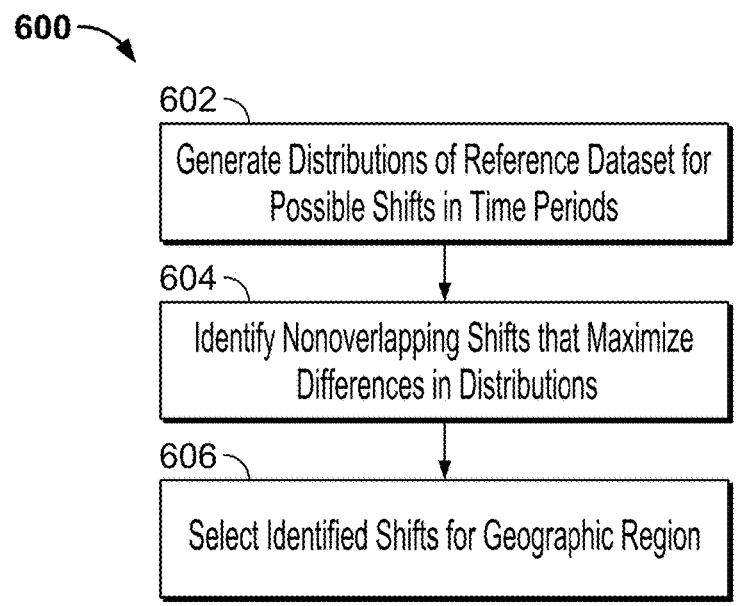
FIG. 6 is a flow-chart depicting an embodiment of a method for selecting shifts for driving routes.

FIG. 6 is a flow-chart depicting an embodiment of method 600 for selecting shifts for driving route(s) for mobile sensor platforms such as mobile sensor platforms 102. Thus, method 600 is utilized to determine times during which mobile sensor platforms mounted on vehicles are driven through a geographic region. Method 600 may be of particular utility if there is incomplete coverage of a particular time period. For example, collecting data on mobile sensor platforms (i.e. driving vehicles) twenty-four hours per day may not be possible based on various constraints. Method 600 may be used to better select time periods for collecting environmental data at particular geographic segment(s). Method 600 is described in the context of system 100 and mobile sensor platform(s) 102, but may be performed using other systems. For clarity, only some portions of method 600 are shown. Although shown in a sequence, in some embodiments, processes may occur in parallel and/or in a different order. Method 600 utilizes the reference dataset selected at 204 in some embodiments. However, if method 600 is used to update route selection, environmental data collected by mobile sensor platform(s) 102 may be used in addition to or in lieu of the reference dataset Distributions of concentrations of environmental constituents (e.g. pollutants) are generated for the reference dataset for possible shifts, at 602. For example, suppose twelve hour shifts are used, PM 2.5 is the constituent of interest, and a single day is a time period for which shifts are desired. The reference dataset is used at 602 to generate the distributions of PM 2.5 for shifts from 12 AM-12 PM, 1 AM-1 PM, 2 AM-2 PM, . . . 11 PM-11 AM. Thus, twenty four distributions are generated.

Shifts having large differences in distributions are identified, at 604. In some embodiments, non-overlapping shifts are selected. Non-overlapping shifts may be used to reduce gaps in coverage. In some embodiments, shifts may overlap by a particular amount (e.g. one hour). Overlapping shifts might be selected to allow for shift changes. In the example above, the non-overlapping shifts that might be selected are 3 AM-3 PM and 3 PM-3 AM of the following day. In some embodiments, the shifts selected have the maximum difference in the distributions. For example, the Jensen-Shannon Distance Metric (JSdist) might be used. A maximum in JSdist indicates the largest difference in the shifts. These identified shifts are selected for the geographic region, at 606.

Figure 7:
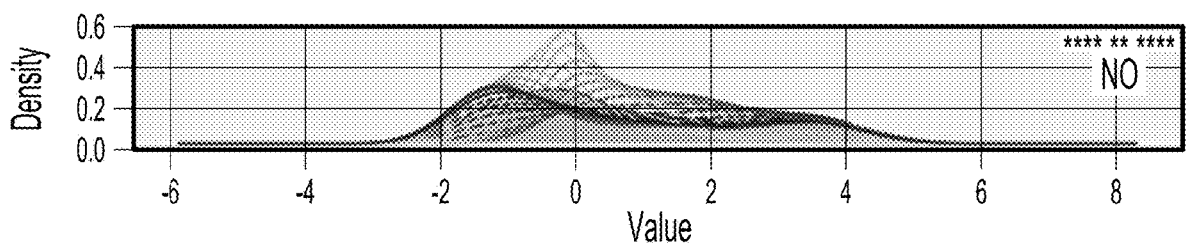
FIG. 7 depicts graphs of the probability of certain pollutant concentrations versus concentration for various shifts.
Figure 7:
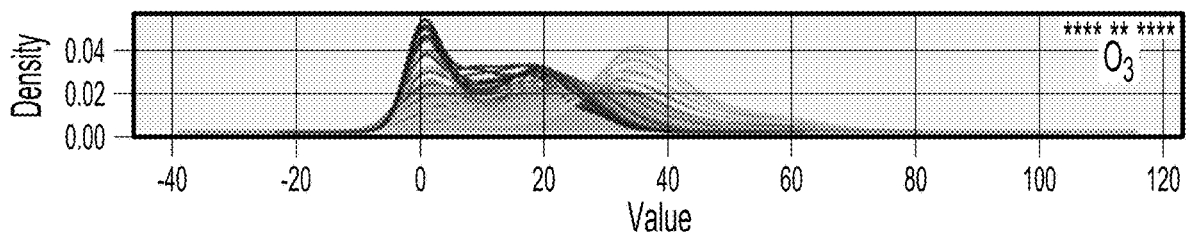
Figure 7:
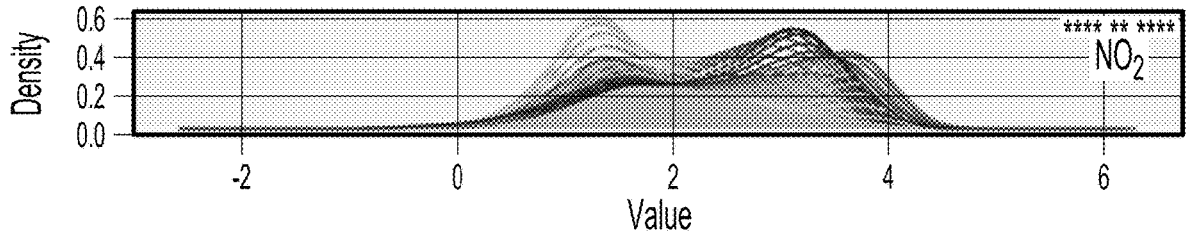
Figure 7:
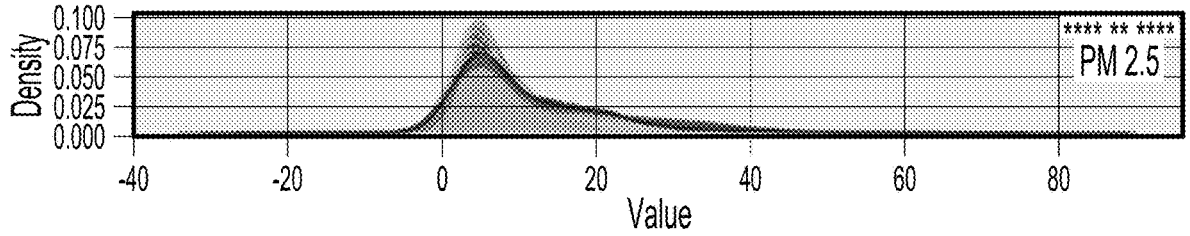

For example, FIG. 7 depicts graphs of the probabilities of pollutant concentrations of NO, $O_3$, $NO_2$ and PM 2.5 versus concentration for concentrations measured during various shifts. In FIG. 7, each shift is eight hours long and depicted by a line. Thus, each graph indicates that there are differences in concentrations of the particular pollutant for different shifts. Nonoverlapping shifts having the largest differences in the distribution may be selected using method 600.

Thus, using methods 200, 300, and 400, the minimum number of distinct samples and the number of passes may be determined for a particular precision level. Using method 600, the shifts driven to obtain the minimum number of distinct samples and the number of passes for the particular precision level may be selected. Thus, environmental data having the desired precision may be obtained by measuring during times (shifts) for which the largest variations may be found. As a result, data for an environmental assessment may be efficiently gathered. Further, processing may be facilitated by including sufficiently diverse data without requiring that overly large volumes of data be collected and processed.

Figure 8:
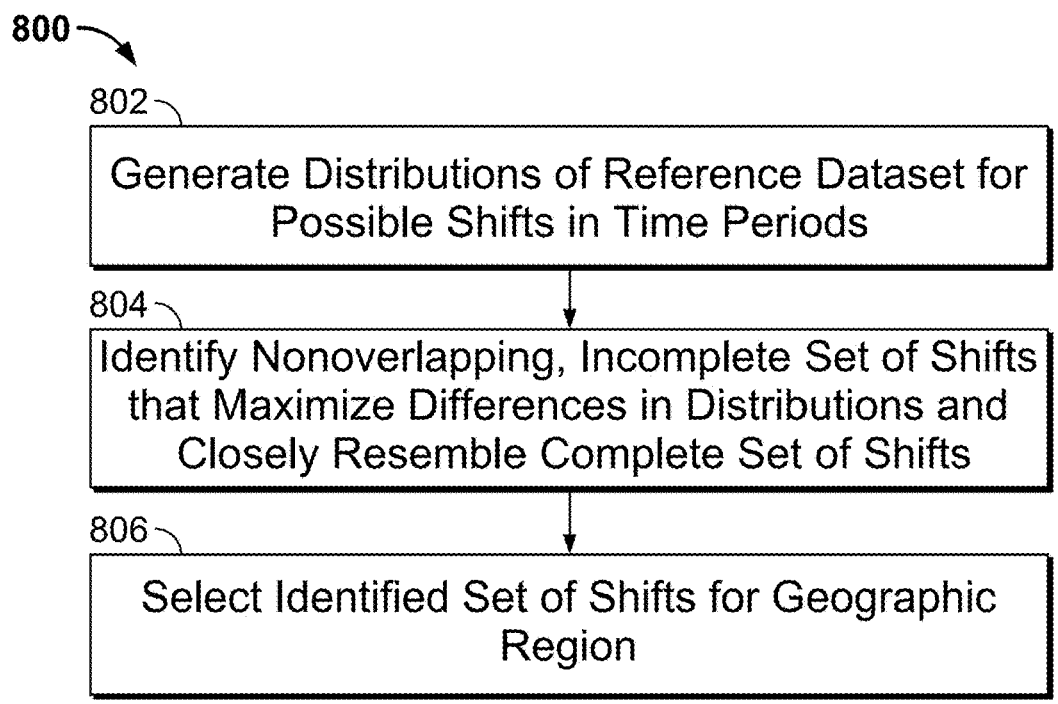
FIG. 8 is a flow-chart depicting an embodiment of a method for selecting shifts for driving routes.

FIG. 8 is a flow-chart depicting an embodiment of method 800 for selecting shifts for driving route(s) for mobile sensor platforms such as mobile sensor platforms 102. Method 800 is described in the context of system 100 and mobile sensor platform(s) 102, but may be performed using other systems. For clarity, only some portions of method 800 are shown. Although shown in a sequence, in some embodiments, processes may occur in parallel and/or in a different order. Method 800 utilizes the reference dataset selected at 204 in some embodiments. However, if method 800 is used to update route selection, environmental data collected by mobile sensor platform(s) 102 may be used in addition to or in lieu of the reference dataset. Method 800 may be used when an insufficient number of shifts are possible for a particular time period. For example, method 800 may be used in lieu of method 600 if there are an insufficient number of drivers to man all of the shifts.

Distributions are generated for the reference dataset for possible shifts, at 802. In some embodiments, 802 is analogous to 602. Shift(s) having large differences in distributions and which, when combined, closely resemble a complete set of reference data for the time period of the shift(s) are identified, at 804. These shift(s) are selected for use in the geographic region, at 806. In some embodiments, non-overlapping shifts are selected. In some embodiments, shifts may overlap by a particular amount (e.g. one hour). Overlapping shifts might be selected to allow for shift changes. In some embodiments, the shifts selected have the maximum difference in the distributions or close to it. For example, shifts having a large JSdist but which also sufficiently match the reference dataset may be used. A maximum in JSdist indicates the largest difference in the shifts. Other limitations that affect the optimization of driving shifts may also exist, such as the omission of certain driving hours. If only one driving shift is used, the probability distribution of a single subsampled driving shift that most closely aligns with the probability distribution of the complete probability distribution may be selected.

Figure 9:
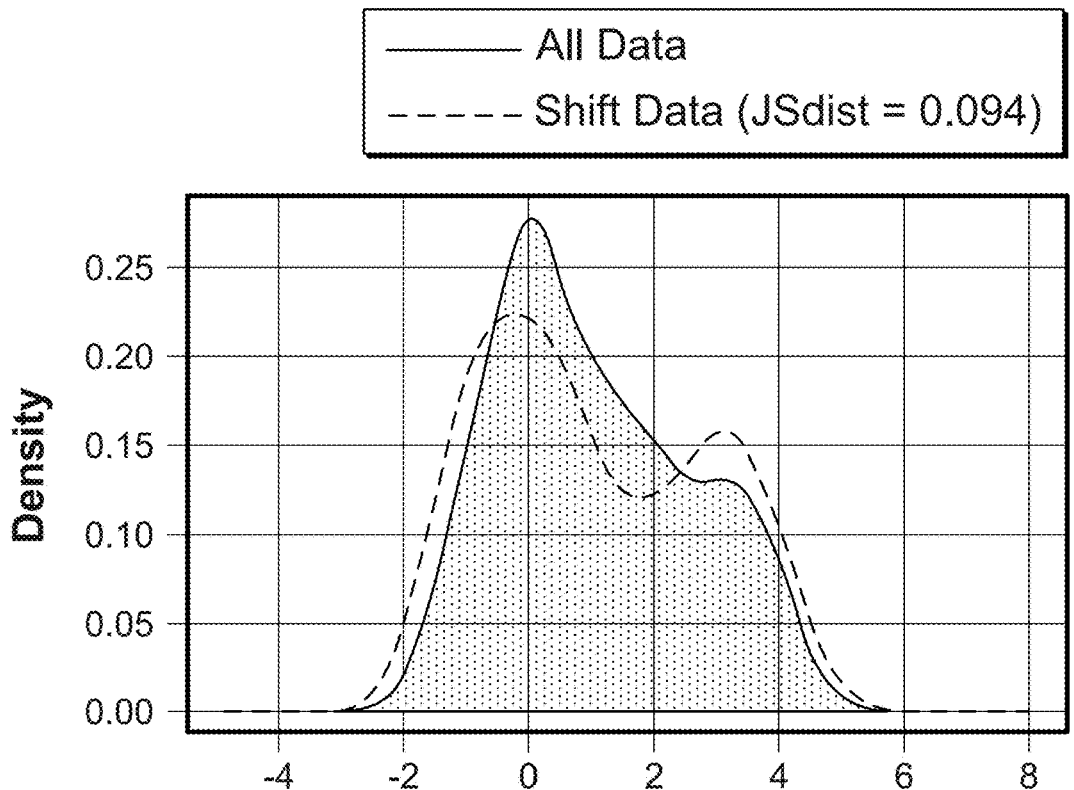
FIG. 9 depicts graphs of the probability of a certain pollutant concentrations versus concentration for a shift.

FIG. 9 depicts graphs of the probabilities of a certain pollutant concentration versus concentration for shift(s). In addition to having a large JSdist, the shift data relatively closely matches the data from the reference dataset. Thus, the shift(s) identified and selected not only have differing distributions, but also match the reference dataset.

Thus, using methods 200, 300, and 400, the minimum number of distinct samples and the number of passes may be determined for a particular precision level. Using method 800, the shifts driven to obtain the minimum number of distinct samples and the number of passes for the particular precision level may be selected even when full coverage of the time period is not possible. Thus, environmental data having the desired precision may be obtained by measuring during times (shifts) for which the largest variations may be found. As a result, data for an environmental assessment may be efficiently gathered. Further, processing may be facilitated by including sufficiently diverse data without requiring that overly large volumes of data be collected and processed.

Figure 10:
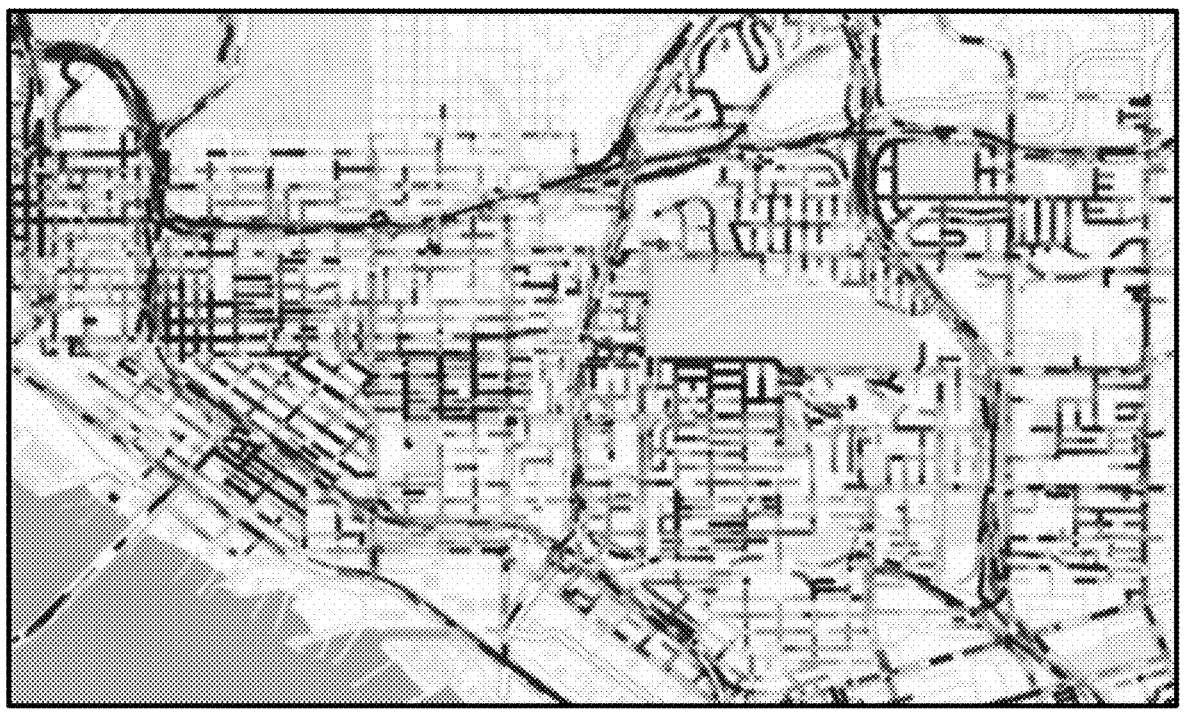
FIG. 10 depicts an embodiment of a map indicating the baselines for road segments.

FIG. 10 depicts an embodiment of a map 1000 indicating the baselines for road segments. Map 1000 may be generated from data collected using routes identified with method(s) 200, 300, 400, 600, and/or 800. Thus, the geographic region shown in map 1000 may be part of a city and the geographic segments are the road segments shown. As shown in FIG. 10, the shade of each road segment indicates the baseline level calculated from the aggregation of the minimum number of distinct samples for each road segment for multiple passes. If this monitoring period lasts for a year, map 1000 is an annual baseline map. Baselines for other time periods and/or other measures of the environmental quality may be provided in other embodiments. Thus, environmental data having the desired precision may be collected in an efficient manner without producing overly large amounts of extraneous data, and the relatively modest amount of data may be efficiently and rapidly processed to provide map 1000. Consequently, individuals may be better able to assess the environmental quality of their surroundings.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for routing, through a geographic region over a time interval, a sensor platform mounted on a vehicle, comprising:
   receiving a precision level for at least one constituent of an environment measured by a sensor of the sensor platform, the precision level corresponding to a mean concentration of the at least one constituent over the time interval;
   selecting a reference dataset corresponding to the geographic region and the time interval;
   determining, from the reference dataset and the precision level, at least one minimum number of distinct samples for a plurality of geographic segments of the geographic region; and
   determining a number of passes for the geographic region over the time interval using the minimum number of distinct samples for each of the plurality of geographic segments, each pass of the number of passes being part of a route for the vehicle.

2. The method of claim 1, wherein the precision level is based on a tolerance in a relative error rate and a false positive error rate.

3. The method of claim 2, wherein the determining the at least one minimum number of distinct samples includes accounting for a sensor measurement error.

4. The method of claim 2, wherein the determining the at least one minimum number of distinct samples further includes:
   dividing the reference dataset into a plurality of strata, each of the plurality of strata including a subpopulation size and corresponding to a portion of the time interval;
   determining an allocation proportion of a total sample size to each stratum;
   determining a per stratum number of distinct samples for each stratum; and
   selecting a plurality of samples from each of the plurality of strata according to
   the allocation proportion and the total sample size.

5. The method of claim 1, wherein the plurality of geographic segments include a plurality of road segments, each of the plurality of road segments having a length not exceeding one hundred meters.

6. The method of claim 1, wherein the plurality of geographic segments include a plurality of cells, each of the plurality of cells having a characteristic length not exceeding two hundred meters.

7. The method of claim 1, wherein the determining the number of passes further includes:
   determining, using the reference dataset, a time period for each pass of a portion of the plurality of geographic segments, the time period being within a twenty-four hour period.

8. The method of claim 1, wherein the reference dataset includes at least one of stationary sensor site data, satellite data, and stationary sensor network data.

9. A system for routing, through a geographic region over a time interval, a sensor platform mounted on a vehicle, comprising:
   a processor configured to:
      receive a precision level for at least one constituent of an environment measured by a sensor of the sensor platform, the precision level corresponding to a mean concentration of the at least one constituent over the time interval;
      select a reference dataset corresponding to the geographic region and the time interval;
      determine, from the reference dataset and the precision level, at least one minimum number of distinct samples for a plurality of geographic segments of the geographic region; and
      determine a number of passes for the geographic region over the time interval using the minimum number of distinct samples for each of the plurality of geographic segments, each pass of the number of passes being part of a route for the vehicle; and
   a memory coupled to the processor and configured to provide the processor with instructions.

10. The system of claim 9, wherein the precision level is based on a tolerance in a relative error rate and a false positive error rate.

11. The system of claim 10, wherein to determine the at least one minimum number of distinct samples, the processor is further configured to account for a sensor measurement error.

12. The system of claim 10, wherein to determine the at least one minimum number of distinct samples, the processor is further configured to:
   divide the reference dataset into a plurality of strata, each of the plurality of strata including a subpopulation size and corresponding to a portion of the time interval;
   determine an allocation proportion of a total sample size to each stratum;
   determine a per stratum number of distinct samples for each stratum; and
   select a plurality of samples from each of the plurality of strata based on the allocation proportion and the total sample size.

13. The system of claim 9, wherein the plurality of geographic segments include a plurality of road segments, each of the plurality of road segments having a length not exceeding one hundred meters.

14. The system of claim 9, wherein the plurality of geographic segments include a plurality of cells, each of the plurality of cells having a characteristic length not exceeding two hundred meters.

15. The system of claim 9, wherein to determine the number of passes, the processor is further configured to:
   determine, using the reference dataset, a time period for each pass of a portion of the plurality of geographic segments, the time period being within a twenty-four hour period.

16. The system of claim 15, wherein the reference dataset includes at least one of stationary sensor site data, satellite data, and stationary sensor network data.

17. A computer program product for routing, through a geographic region over a time interval, a sensor platform mounted on a vehicle, the computer program product being embodied in a non-transitory computer readable storage medium and comprising computer instructions for:
   receiving a precision level for at least one constituent of an environment measured by a sensor of the sensor platform, the precision level corresponding to a mean concentration of the at least one constituent over the time interval;

selecting a reference dataset corresponding to the geographic region and the time interval;

determining, from the reference dataset and the precision level, at least one minimum number of distinct samples for a plurality of geographic segments of the geographic region; and determining a number of passes for the geographic region over the time interval using the minimum number of distinct samples for each of the plurality of geographic segments, each pass of the number of passes being part of a route for the vehicle.

18. The computer program product of claim 17, wherein the computer instructions for determining the at least one minimum number of distinct samples further includes computer instructions for:

dividing the reference dataset into a plurality of strata, each of the plurality of strata including a subpopulation size and corresponding to a portion of the time interval;

determining an allocation proportion of a total sample size to each stratum;

determining a per stratum number of distinct samples for each stratum; and selecting a plurality of samples from each of the plurality of strata.

* * * * *

UNITED STATES PATENT AND TRADEMARK OFFICE
CERTIFICATE OF CORRECTION

PATENT NO. : 11,553,318 B2
APPLICATION NO. : 17/332789
DATED : January 10, 2023
INVENTOR(S) : Jie Hu, Jessica Jenkins and Nicole Goebel It is certified that error appears in the above-identified patent and that said Letters Patent is hereby corrected as shown below:

In the Specification

In Column 13, Line 65, delete "$P(|\bar{\mu}-\mu|\geq\delta\mu)\leq\alpha,$" and insert --$P(|\bar{\mu} - \mu| \geq \gamma\mu) \leq \alpha,$-- therefor.

In Column 17, Line 25, delete "$N=\Sigma_{h=1}^{H}N_h$" and insert --$N = \sum_{h=1}^{H} N_h$--, therefor.

In Column 17, Line 33, delete "$n=\Sigma_{h=1}^{H}n_h$" and insert --$n = \sum_{h=1}^{H} n_h$--, therefor.

In Column 18, Line 10, delete "$E_{h=1}^{H}(W_h s_h)$" and insert --$\sum_{h=1}^{H}(W_h s_h)$--, therefor.

Signed and Sealed this
Twelfth Day of November, 2024

*Katherine Kelly Vidal*
Katherine Kelly Vidal
*Director of the United States Patent and Trademark Office*